(12) United States Patent
Song et al.

(10) Patent No.: US 11,880,108 B2
(45) Date of Patent: Jan. 23, 2024

(54) DISPLAY DEVICE, METHOD FOR CONTROLLING DISPLAY DEVICE, AND ELECTRONIC DEVICE

(71) Applicant: Shanghai Tianma Microelectronics Co., Ltd., Shanghai (CN)

(72) Inventors: Anran Song, Shanghai (CN); Yaqin Liao, Shanghai (CN); Xiaohe Li, Shanghai (CN); Jian Zhao, Shanghai (CN); Chunli Ning, Shanghai (CN)

(73) Assignee: SHANGHAI TIANMA MICROELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 17/949,259

(22) Filed: Sep. 21, 2022

(65) Prior Publication Data
US 2023/0418115 A1     Dec. 28, 2023

(30) Foreign Application Priority Data
Jun. 27, 2022 (CN) .......................... 202210737186.3

(51) Int. Cl.
*G02F 1/1343* (2006.01)
*G02F 1/1333* (2006.01)
*G02F 1/1347* (2006.01)

(52) U.S. Cl.
CPC .. *G02F 1/134327* (2013.01); *G02F 1/134345* (2021.01); *G02F 1/1347* (2013.01); *G02F 1/133305* (2013.01)

(58) Field of Classification Search
CPC .......................... G02F 1/134237; G02F 1/1343
See application file for complete search history.

(56) References Cited

U.S. PATENT DOCUMENTS

2016/0011458 A1*   1/2016   Xu ..................... G02F 1/134363
349/96

FOREIGN PATENT DOCUMENTS

| CN | 106526990 A | 3/2017 |
|---|---|---|
| CN | 206684442 U | 11/2017 |
| CN | 110297364 A | 10/2019 |

* cited by examiner

*Primary Examiner* — Dung T Nguyen
(74) *Attorney, Agent, or Firm* — East IP P.C.

(57) ABSTRACT

The present application discloses a display device, a method for controlling the display device, and an electronic device. The display device includes: a first panel and a second panel sequentially stacked along a direction opposite to a light-emitting direction, wherein: the first panel includes first sub-pixels, the second panel includes second sub-pixels; each first sub-pixel is provided with a first electrode, the first electrode has a first extension part, and each second sub-pixel is provided with a second electrode, the second electrode has a second extension part; and in the first panel, first extension parts of first electrodes of at least two adjacent first sub-pixels are arranged in different forms; and/or, in the second panel, second extension parts of second electrodes of at least two adjacent second sub-pixels are arranged in different forms.

29 Claims, 22 Drawing Sheets

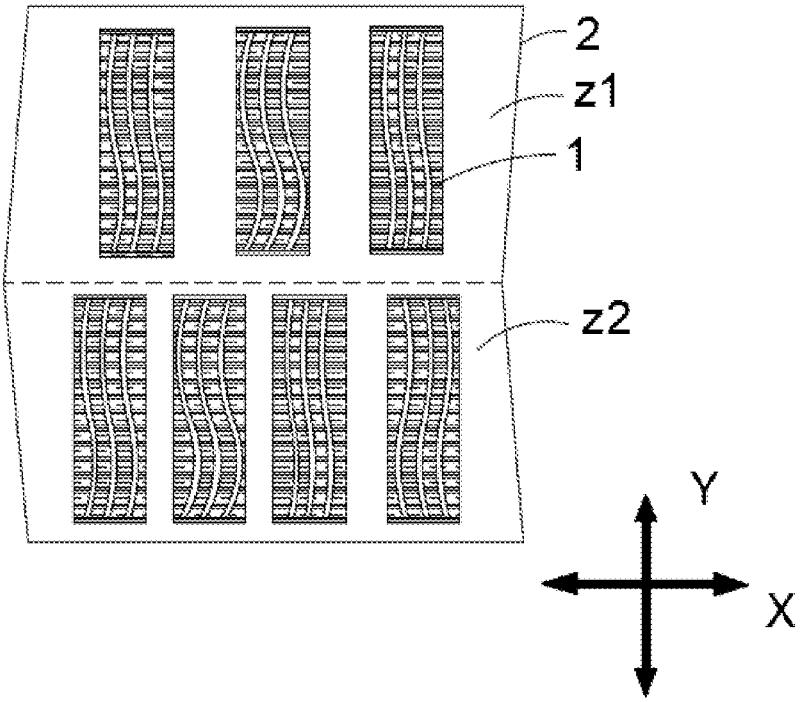

Fig. 33

| | |
|---|---|
| providing a same first driving voltage to a first electrode of each first sub-pixel respectively; and/or providing a same second driving voltage to a second electrode of each second sub-pixel respectively | S110 |
| under the same first driving voltage, deflection angles of liquid crystal molecules driven by two adjacent first electrodes having first extension parts with different arrangement forms are different; and/or under the same second driving voltage, deflection angles of liquid crystal molecules driven by two adjacent second electrodes having second extension parts with different arrangement forms are different | S120 |

Fig. 34

DISPLAY DEVICE, METHOD FOR CONTROLLING DISPLAY DEVICE, AND ELECTRONIC DEVICE

CROSS-REFERENCE TO RELATED APPLICATION

This application claims priority to Chinese Patent Application No. 202210737186.3, filed on Jun. 27, 2022, which is incorporated herein by reference in its entirety.

TECHNICAL FIELD

The present application relates to the technical field of electronic product, and in particular to a display device, a method for controlling the display device, and an electronic device.

BACKGROUND

Liquid Crystal Display (LCD) has advantages of high image quality, power saving, thin body and wide application range, and still occupies a dominant position in the display field at present. The traditional liquid crystal display uses a backlight source and a liquid crystal display device, which has great advantage in white field brightness, but is not satisfactory in viewing angle, black field performance and contrast ratio.

In order to eliminate the defects of the liquid crystal display, a display solution with double-layer display device is proposed. The two panels are stacked. The lower panel can achieve pixel-level light control, and the upper panel is configured for image display. In this manner, contrast ratio of displayed image can be greatly improved, and black field brightness can be greatly reduced when the double-layer display device is turned off. However, the two panels of the double-layer display device may interfere with each other due to structural limitations thereof, thereby generating Moire Pattern and affecting the display effect.

Therefore, there is an urgent need for a new display device, a method for controlling the display device, and an electronic device.

SUMMARY

Embodiments of the present application provide a display device, a method for controlling the display device, and an electronic device.

In a first aspect, the embodiments of the present application provide a display device, including a first panel and a second panel sequentially stacked along a direction opposite to a light-emitting direction, wherein: the first panel includes first sub-pixels, the second panel includes second sub-pixels, the first sub-pixels and the second sub-pixels are respectively arranged in an array along a first direction and a second direction, and the first direction and the second direction intersect with each other; each first sub-pixel is provided with a first electrode, the first electrode has a first extension part, and each second sub-pixel is provided with a second electrode, the second electrode has a second extension part; and in the first panel, first extension parts of first electrodes of at least two adjacent first sub-pixels are arranged in different forms; and/or, in the second panel, second extension parts of second electrodes of at least two adjacent second sub-pixels are arranged in different forms.

In a second aspect, the embodiments of the present application provide a method for controlling a display device, including: providing a same first driving voltage to a first electrode of each first sub-pixel respectively; and/or providing a same second driving voltage to a second electrode of each second sub-pixel respectively, wherein under the same first driving voltage, deflection angles of liquid crystal molecules driven by two adjacent first electrodes having first extension parts with different arrangement forms are different; and/or under the same second driving voltage, deflection angles of liquid crystal molecules driven by two adjacent second electrodes having second extension parts with different arrangement forms are different.

In a third aspect, the embodiments of the present application provide an electronic device, including the display device according to any one of the aforesaid embodiments.

BRIEF DESCRIPTION OF THE DRAWINGS

Drawings necessary for explaining embodiments of the present application are described briefly below to illustrate technical solutions of embodiments of the present application more clearly. Obviously, the drawings described below are merely some embodiments of the present application. Other figures can be obtained by those with ordinary skill in the art from the drawings without any inventive effort.

FIG. 33 is a schematic diagram of relative positions of a first electrode and a second electrode according to another embodiment of the present application;

FIG. 34 is a flowchart of a method for controlling a display device according to an embodiment of the present application.

DETAILED DESCRIPTION

Figure 1:
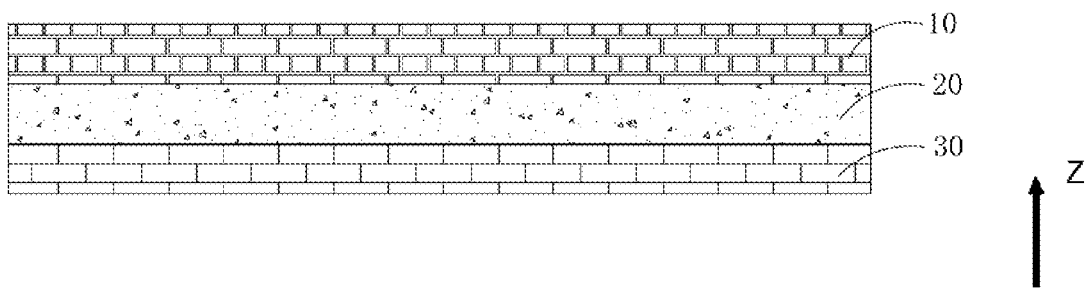
FIG. 1 is a schematic structural diagram of a display device according to an embodiment of the present application.

Features of various aspects and exemplary embodiments of the present application will be described in detail below. In the following detailed description, numerous specific details are presented to provide a thorough understanding of the present application. However, it will be apparent for those skilled in the art that, the present application may be implemented without some of these specific details. The following description of the embodiments is merely to provide a better understanding of the present application by illustrating examples of the present application.

It should be noted that, relational terms such as first, second, and the like are used herein merely to distinguish one entity or operation from another without necessarily requiring or implying any such actual relationship or order between such entities or operations. Moreover, the terms "include", "including", or any other variation thereof, are intended to cover a non-exclusive inclusion, such that a(n) process, method, article or device that includes a series of elements not only includes those elements but also includes other elements not explicitly listed or also includes elements inherent to such process, method, article or device. An element preceded by "include . . . " does not, without more constraints, preclude the existence of additional identical elements in the process, method, article or device that includes the element. Without further limitation, an element defined by the term "including . . . " does not preclude presence of additional elements in a process, method, article or device that includes the element.

In the related art, two panels of a display device are stacked. A first panel 10 and a second panel 20 respectively include first sub-pixels p1 and second sub-pixels p2. The first sub-pixels p1 and the second sub-pixels p2 are arranged in a regular array, and thus light output from the first sub-pixels p1 and the second sub-pixels p2 is also regular. According to Moire Pattern principle, Moire Pattern is a visual result of interference between two lines or two objects at a constant angle and frequency. When human eye cannot distinguish these two lines or two objects, he or she can only see interference pattern, which is an optical phenomenon called Moire Pattern. Therefore, interference between light output from the first sub-pixels p1 and the second sub-pixels p2 will produce Moire Pattern, which is macroscopically manifested as a lattice pattern. This is a high-frequency irregular fringe that will cause an image to appear colorful and influence display effect of the display device.

Specifically, the display device further includes a backlight module 30 arranged on one side of the second panel 20 away from the first panel 10. Light emitted from the backlight module 30 enters the first panel 10 in a polarized state to serve as light source of the first panel 10. The polarized light passes through a stack with a certain thickness formed by the second panel 20, optical adhesive, polarizer and so on, and refractive index of one part of the stack is different from refractive index of the other part thereof. Therefore, there will be phase difference between the light after passing through the stack. The light with phase difference passes through the first sub-pixels p1 arranged in an array of the first panel 10, and Moire Pattern will be generated due to mutual interference, which will be observed by human eye.

In order to solve the above problem, in the embodiment of the present application, first extension parts 11 of first electrodes 1 of at least two adjacent first sub-pixels p1 are arranged in different forms, and/or, second extension parts 21 of second electrodes 2 of at least two adjacent second sub-pixels p2 are arranged in different forms, so as to disrupt regularity of light output from the first sub-pixels p1 and/or the second sub-pixels p2, and reduce the generation of Moire Pattern to improve display effect of the display device.

The display device according to the embodiment of the present application will be described taking the first panel 10 and the second panel 20 of the display device both being Liquid Crystal Display (LCD) as an example.

For better understanding of the present application, the display device, a method for controlling the display device, and an electronic device according to the embodiments of the present application will be described in detail below with reference to FIGS. 1 to 34.

Figure 2:
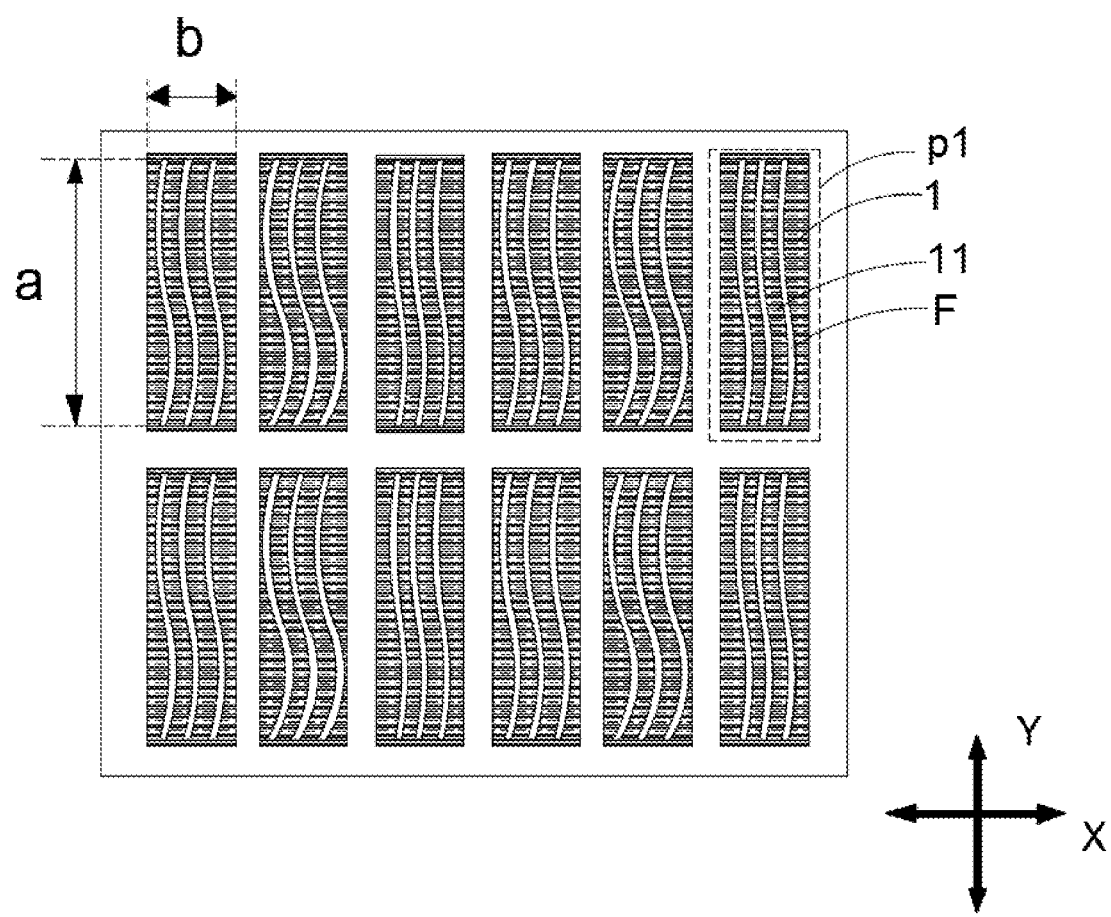
FIG. 2 is a schematic diagram of an arrangement of first electrodes according to an embodiment of the present application.
Figure 3:
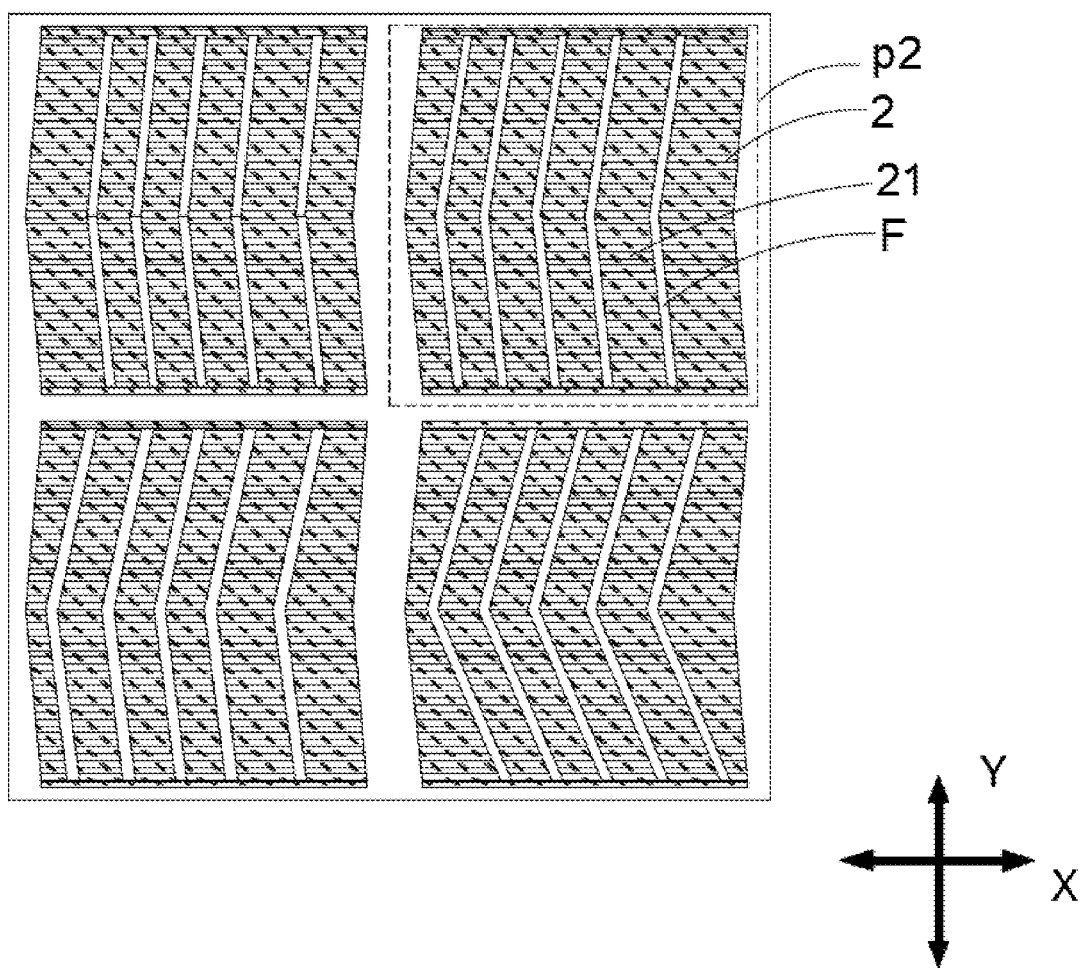
FIG. 3 is a schematic diagram of an arrangement of second electrodes according to an embodiment of the present application.

Please refer to FIGS. 1 to 3 together, FIG. 1 is a schematic structural diagram of a display device according to an embodiment of the present application; FIG. 2 is a schematic diagram of an arrangement of first electrodes according to an embodiment of the present application; and FIG. 3 is a schematic diagram of an arrangement of second electrodes according to an embodiment of the present application. An embodiment of the present application provides a display device, which includes a first panel 10 and a second panel 20 sequentially stacked along a direction opposite to a light-emitting direction Z. The first panel includes first sub-pixels p1, and the second panel 20 includes second sub-pixels p2. The first sub-pixels p1 and the second sub-pixels p2 are respectively arranged in an array along a first direction Y and a second direction X, and the first direction Y and the second direction X intersect with each other. Each first sub-pixel p1 is provided with a first electrode 1, and the first electrode 1 has a first extension part 11. Each second sub-pixel p2 is provided with a second electrode 2, and the second electrode 2 has a second extension part 21. In the first panel 10, first extension parts 11 of first electrodes 1 of at least two adjacent first sub-pixels p1 are arranged in different forms; and/or, in the second panel 20, second extension parts 21 of second electrodes 2 of at least two adjacent second sub-pixels p2 are arranged in different forms.

The display device according to the embodiment of the present application includes a first panel 10 and a second panel 20. The first panel 10 includes first sub-pixels p1, and each first sub-pixel p1 is provided with a first electrode 1. The first electrode 1 has a first extension part 11, and the arrangement form of the first extension part 11 can affect an electric field generated by the first electrode 1, thereby affecting the light-emitting effect of the corresponding first sub-pixel p1. Therefore, in this embodiment, in the first panel 10, first extension parts 11 of first electrodes 1 of at least two adjacent first sub-pixels p1 are arranged in different forms, whereby light-emitting effects of this part of first sub-pixels p1 are different, and regularity of light output from this part of first sub-pixels p1 of the first panel can be disrupted. Similarly, second extension parts 21 of second electrodes 2 of at least two adjacent second sub-pixels p2 may be arranged in different forms, whereby regularity of light output from this part of second sub-pixels p2 of the second panel 20 can be disrupted. Mutual interference between the first panel 10 and the second panel 20 due to regular periodic structure thereof can be prevented. Therefore, the generation of Moire Pattern can be effectively reduced, and display effect of the display device can be improved.

Specifically, a part of the reason for the generation of Moire Pattern is that, in the related art, after light passes through the second panel 20, due to reflection delay thereof, two beams of light enter the first panel 10 one after another. Since the first sub-pixels p1 of the first panel 10 are arranged in a same manner, a fixed phase difference is generated and new interference occurs. Moreover, since the radiation range of the same light beam (outgoing light and reflected light) is limited, this interference mainly occurs between several adjacent sub-pixels. By changing the arrangement form of the first extension part 11 and/or the second extension part 21 of the adjacent sub-pixels, the phase difference of the light in the light-transmitting area of the first sub-pixels p1 and/or the second sub-pixels p2 is changed, so as to disrupt one of the interference generation conditions (fixed phase difference), and reduce the interference phenomenon occurring between several adjacent first sub-pixels p1 and/or second sub-pixels p2.

It should be noted that, with respect to the two arrangement forms, i.e., the first extension parts 11 of first electrodes 1 of at least two adjacent first sub-pixels p1 are arranged in different forms, and the second extension parts 21 of second electrodes 2 of at least two adjacent second sub-pixels p2 are arranged in different forms, only one of them may be applied. For example, as shown in FIG. 2, the first extension parts 11 of first electrodes 1 of at least two adjacent first sub-pixels p1 may be arranged in different forms, while the second extension parts 21 of second electrodes 2 of the second sub-pixels p2 may be arranged in a same form. However, since the first extension parts 11 of first electrodes 1 of at least two adjacent first sub-pixels p1 are arranged in different forms, the light-emitting effect of this part of first sub-pixels p1 and the corresponding second sub-pixels p2 is different from the light-emitting effect of the other first sub-pixels p1 in which the arrangement form of the first extension parts 11 is not adjusted and the corresponding second sub-pixels p2. That is, the regularity of light output from the first sub-pixels p1 and the second sub-pixels p2 of the first panel 10 and the second panel 20 can be disrupted. It is also possible to only enable that the second extension parts 21 of second electrodes 2 of at least two adjacent second sub-pixels p2 are arranged in different forms, as shown in FIG. 3.

Optionally, the first electrode 1 has a slit F for light to pass through, and a pattern formed between adjacent slits F is the first extension part 11. The arrangement form of the first extension part 11 includes but is not limited to shape, extension direction, extension length, number, arrangement position, and the like.

As shown in FIG. 2, in some optional embodiments, a length a of the first sub-pixel p1 along the first direction Y is greater than a length b of the first sub-pixel p1 along the second direction X, and the first extension parts 11 of first electrodes 1 of adjacent first sub-pixels p1 along the second direction X are arranged in different forms.

It should be noted that, the inventors found that when the length a of the first sub-pixel p1 along the first direction Y is greater than the length b of the first sub-pixel p1 along the second direction X, the Moire Pattern generated by the first sub-pixel p1 along the second direction X is more apparent.

Optionally, when the length a of the first sub-pixel p1 along the first direction Y is greater than the length b of the first sub-pixel p1 along the second direction X, a width of the slit of the first electrode 1 of the first sub-pixel p1 along the first direction Y is also greater than a width of the slit thereof along the second direction X. According to the interference principle, a distance between the two main bright fringes $\Delta X = N*D*\lambda/d$, where N is a number of slits, D is a distance from the slit F to a screen, d is a distance between the slits F, and is a wavelength. The probability of the interference dart parts being identified increases as the slit width decreases, and the Moire Pattern becomes more apparent.

Therefore, when the length a of the first sub-pixel p1 along the first direction Y is greater than the length b of the first sub-pixel p1 along the second direction X, the Moire Pattern generated by the first sub-pixel p1 along the second direction X is more apparent compared with the Moire Pattern generated by the first sub-pixel p1 along the first direction Y. In the embodiment of the present application, the first extension parts 11 of first electrodes 1 of adjacent first sub-pixels p1 along the second direction X are arranged in different forms, such that phase difference of light output from the adjacent first sub-pixels p1 changes, to disrupt the interference conditions and reduce the occurrence of Moire Pattern in the display area corresponding to the first sub-pixels p1 along the second direction X.

And/or, a length of the second sub-pixel p2 along the first direction Y is greater than a length of the second sub-pixel p2 along the second direction X, and the second extension parts 21 of second electrodes 2 of adjacent second sub-pixels p2 along the second direction X are arranged in different forms.

Similarly, when the length of the second sub-pixel p2 along the first direction Y is greater than the length of the second sub-pixel p2 along the second direction X, the Moire Pattern generated by the second sub-pixel p2 along the second direction X is more apparent. The second extension parts 21 of second electrodes 2 of adjacent second sub-pixels p2 along the second direction X are arranged in different forms, such that phase difference of light output from the adjacent second sub-pixels p2 along the second direction X changes, to disrupt the interference conditions and reduce the occurrence of Moire Pattern in the display area corresponding to the second sub-pixels p2 along the second direction X.

Figure 4:
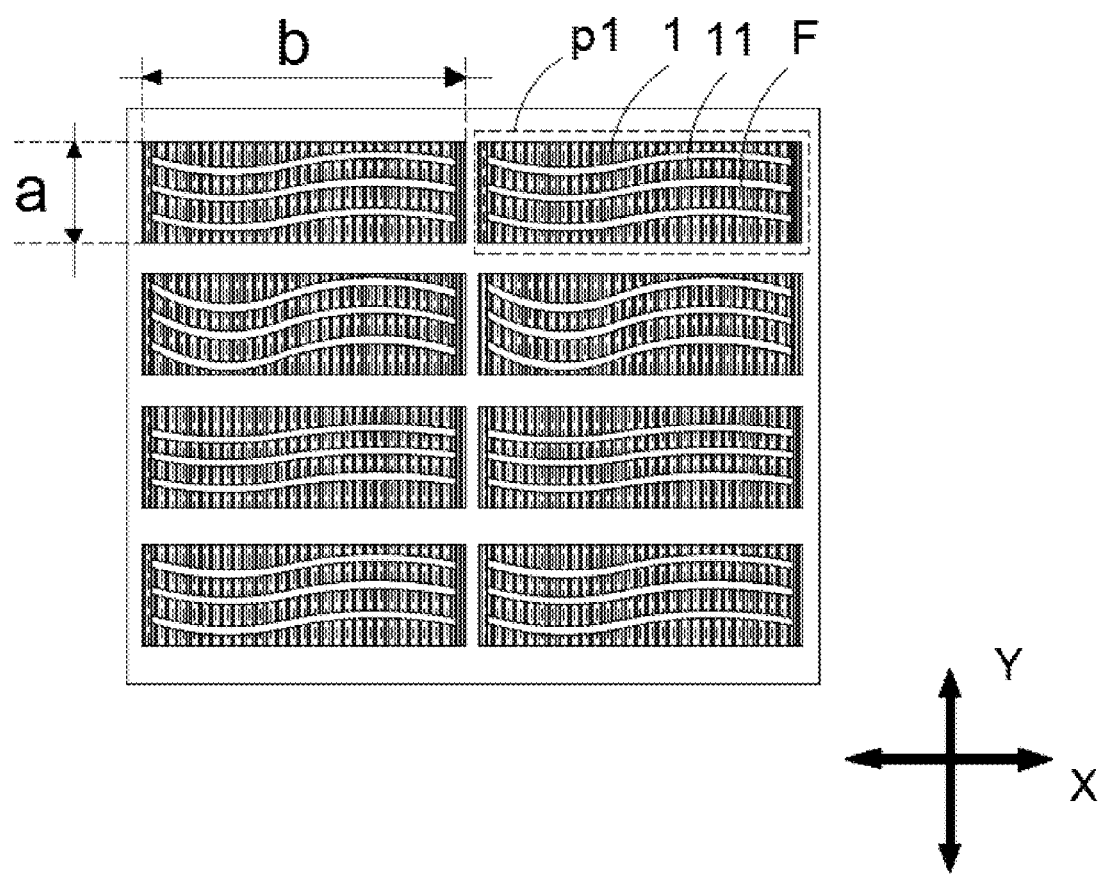
FIG. 4 is a schematic diagram of an arrangement of first electrodes according to another embodiment of the present application.

Optionally, as shown in FIG. 4, FIG. 4 is a schematic diagram of an arrangement of first electrodes 1 according to another embodiment of the present application. A length a of the first sub-pixel p1 along the first direction Y is smaller than a length b of the first sub-pixel p1 along the second direction X, and the first extension parts 11 of first electrodes 1 of adjacent first sub-pixels p1 along the first direction Y are arranged in different forms, to reduce the occurrence of Moire Pattern in the display area corresponding to the first sub-pixels p1 along the first direction Y.

In some optional embodiments, a length of the first extension part 11 along the first direction Y is greater than a length of the first extension part 11 along the second direction X, such that the length of the first extension part 11 along the first direction Y and the length of the first extension part 11 along the second direction X match with the overall size of the first sub-pixel p1. That is, when the length a of the first sub-pixel p1 along the first direction Y is greater than the length b of the first sub-pixel p1 along the second direction X, the length of the first extension part 11 along the first direction Y is also greater than the length of the first extension part 11 along the second direction X to facilitate the manufacturing of the first extension part 11.

Correspondingly, a length of the second extension part 21 along the first direction Y may be greater than a length of the second extension part 21 along the second direction X, such that the length of the second extension part 21 along the first direction Y and the length of the second extension part 21 along the second direction X match with the overall size of the second sub-pixel p2 to facilitate the manufacturing of the second extension part 21. In some optional embodiments, the first sub-pixels p1 have a same color in the first direction Y. It should be noted that, the first sub-pixels p1 having the same color in the first direction Y means that, light output from each of the first sub-pixels p1 in the first direction Y has the same color, i.e., has a same wavelength and a same frequency. According to conditions for generation of stable interference, for coherent light sources emitting two kinds of light waves having a same frequency, a constant phase difference, and a same vibration direction, light interference can be generated. Interference will occur between light beams from the first sub-pixels p1 having the same light-emitting frequency, thereby generating Moire Pattern. Therefore, in the embodiment of the present application, the first extension parts 11 of the first electrodes 1 of the adjacent first sub-pixels p1 along the first direction Y are arranged in different forms, so as to adjust phase difference of the light output from the first sub-pixels p1 having the same color along the first direction Y, disrupt interference conditions, and reduce the occurrence of Moire Pattern in the display area corresponding to the first sub-pixels p1 having the same color along the first direction Y.

Similarly, according to the different pixel arrangement forms, the second sub-pixels p2 can also have a same color in the first direction Y. The second extension parts 21 of the second electrodes 2 of the adjacent second sub-pixels p2 along the first direction Y are arranged in different forms, so as to reduce the occurrence of Moire Pattern in the display area corresponding to the second sub-pixels p2 having the same color along the first direction Y.

In some optional embodiments, in one single first electrode 1, an area ratio of the first extension part 11 is greater than or equal to one third.

It can be understood that, when the area ratio of the first extension part 11 in one single first electrode 1 is relatively small, it has little effect on the arrangement of the entire first electrode 1 when adjusting the arrangement form of the first extension part 11. Therefore, in this embodiment, by defining that in one single first electrode 1, the area ratio of the first extension part 11 is greater than or equal to one third, it can be ensured that it has apparent effect on the arrangement of the entire first electrode 1 when adjusting the arrangement form of the first extension part 11, thereby causing a significant change in the phase difference of the light output from the adjacent first sub-pixels p1, and further reducing the interference phenomenon between the light output from the adjacent first sub-pixels p1.

Optionally, an area ratio of the second extension part 21 in one single second electrode 2 may also be limited. Specifically, in one single second electrode 2, an area ratio of the second extension part 21 is greater than or equal to one third. In this manner, it can be ensured that it has apparent effect on the arrangement of the entire second electrode 2 when adjusting the arrangement form of the second extension part 21, thereby reducing the interference phenomenon between the light output from the adjacent second sub-pixels p2 and reducing Moire Pattern.

Figure 5:
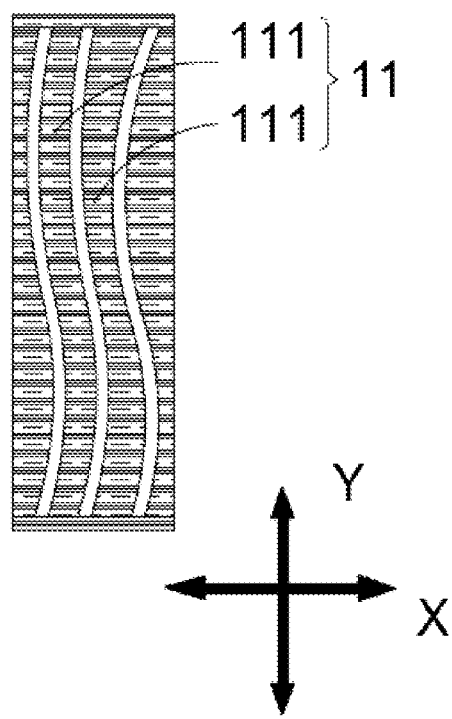
FIG. 5 is a schematic structural diagram of a first electrode according to an embodiment of the present application.

Please refer to FIG. 5, FIG. 5 is a schematic structural diagram of a first electrode 1 according to an embodiment of the present application. The first extension part 11 includes first extension segments 111, and one single first electrode 1 includes at least two first extension segments 111. Each first extension segment 111 extends along the first direction Y on the first electrode 1 and is arranged along the second direction X, and the first extension segments 111 in a same first electrode 1 are arranged in different forms.

It should be noted that, the first extension part 11 is a pattern formed between adjacent slits F of the first electrode 1. Therefore, a number of the first extension segments 111 of one single first electrode 1 can be adjusted by adjusting number, arrangement position, and shape of the slits F in the first electrode 1. By making the arrangement forms of the first extension segments 111 in the same first electrode 1 different, it is possible to increase combinations of the arrangement forms of the first extension parts 11 of the first electrodes 1, and enrich the types of arrangement forms of the first extension parts 11 of the first electrodes 1. In this manner, regularity of light output from the display area corresponding to the first sub-pixels p1 with different arrangement forms of the first extension parts 11 can be disrupted more disorderly, so as to reduce Moire Pattern and improve the display effect of the display device.

Figure 6:
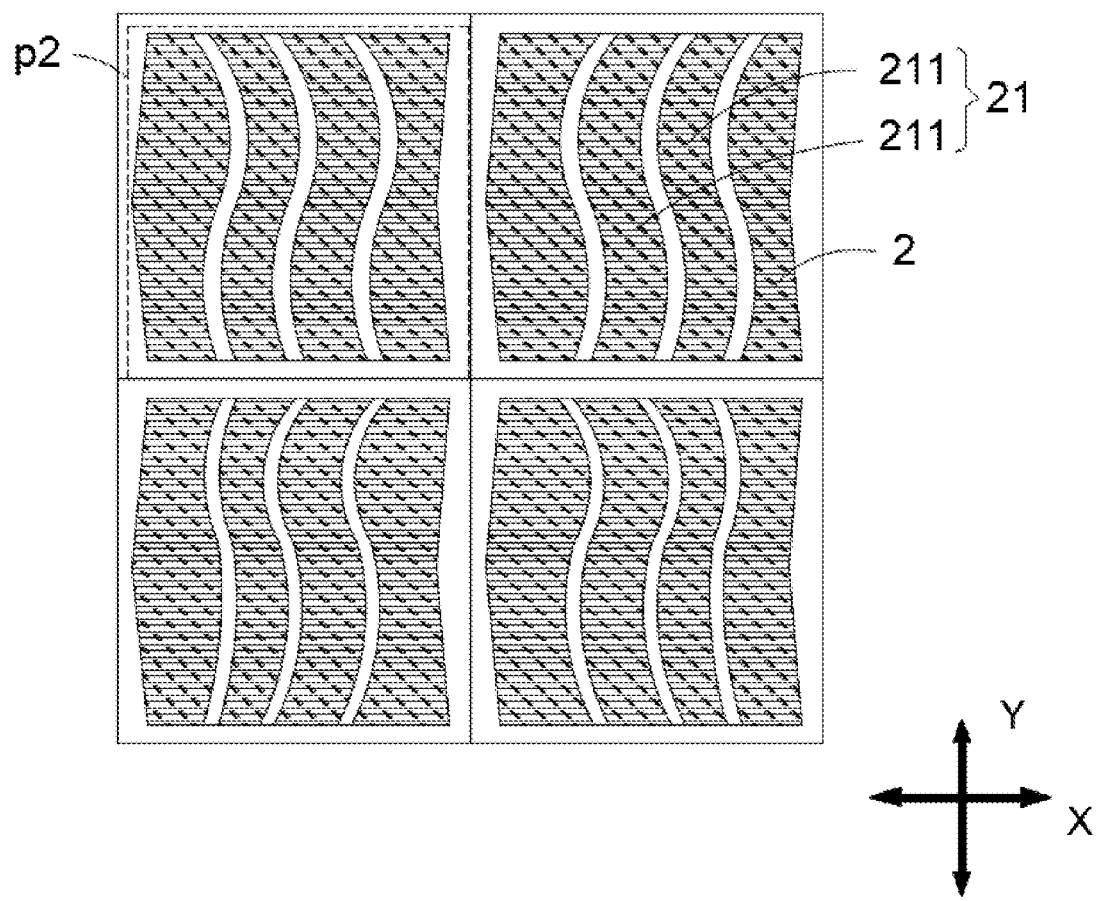
FIG. 6 is a schematic diagram of an arrangement of second electrodes according to another embodiment of the present application.

Please refer to FIG. 6, FIG. 6 is a schematic structural diagram of a second electrode 2 according to an embodiment of the present application. Similarly, the second extension part 21 includes second extension segments 211. One single second electrode 2 includes at least two second extension segments 211, and each second extension segment 211 extends along the first direction Y on the second electrode 2 and is arranged along the second direction X. The second extension segments 211 in a same second electrode 2 are arranged in different forms. The types of arrangement forms of the second extension parts 21 of the second electrode 2 can be enriched, and regularity of light output from the display area corresponding to the second sub-pixels p2 with different arrangement forms of the second to extension parts 21 can be disrupted more disorderly.

Figure 7:
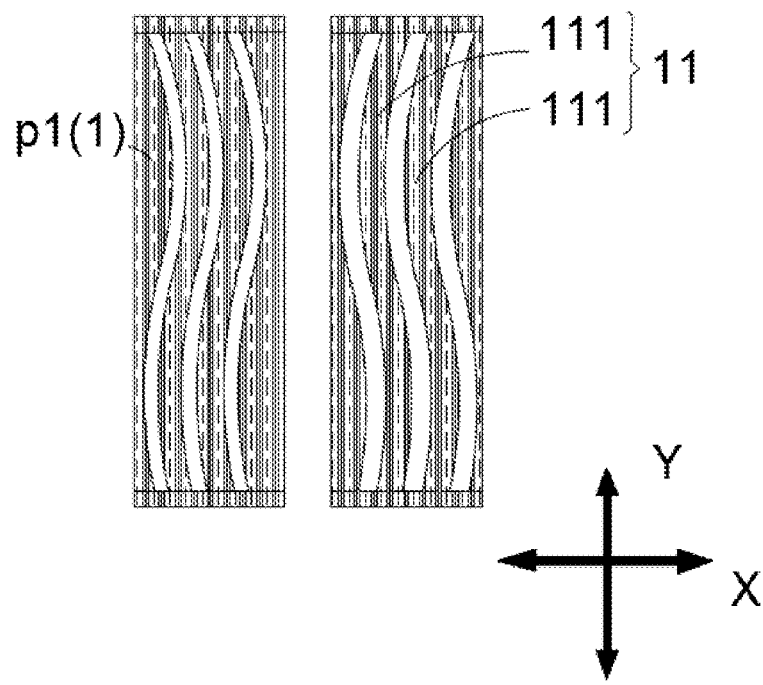
FIG. 7 is a schematic diagram of an arrangement of first electrodes according to another embodiment of the present application.
Figure 8:
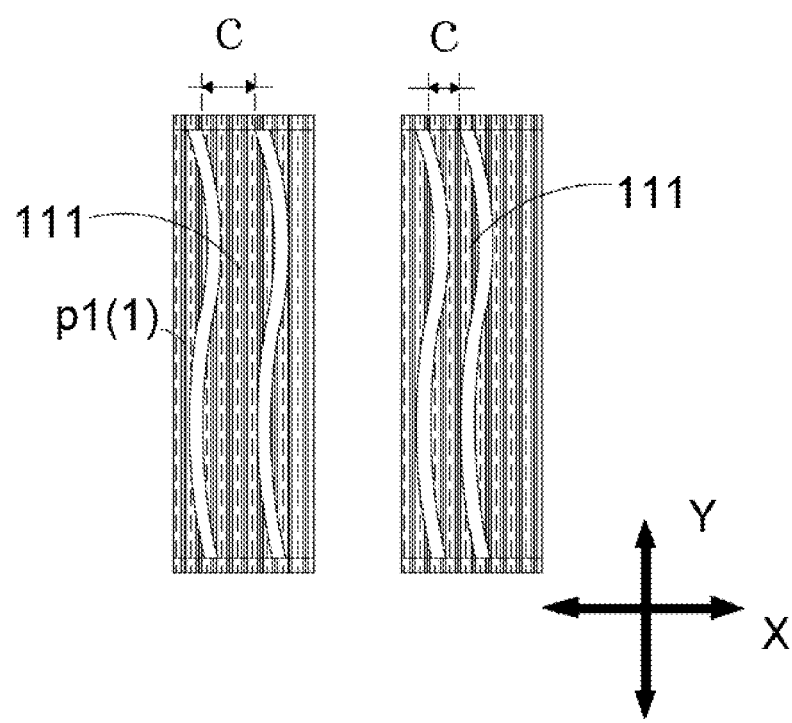
FIG. 8 is a schematic diagram of an arrangement of first electrodes according to another embodiment of the present application.
Figure 9:
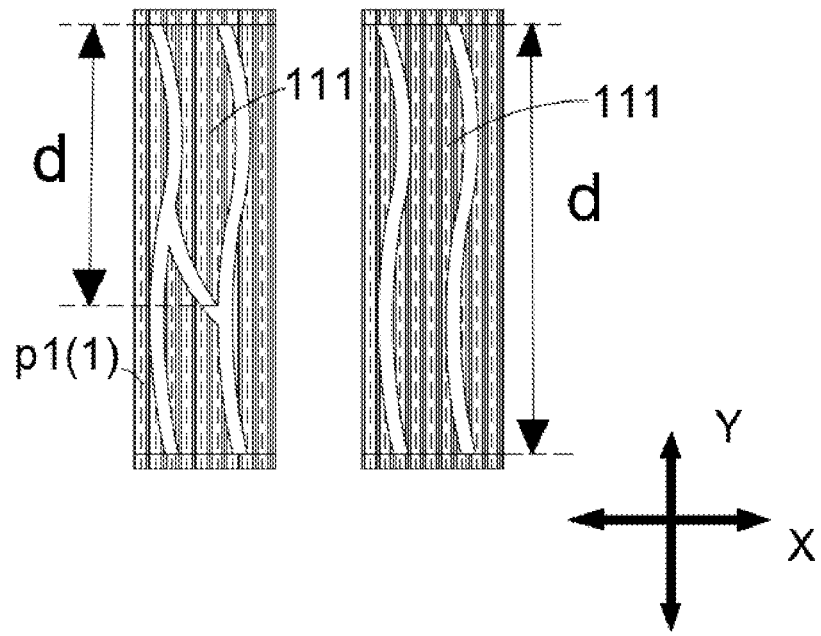
FIG. 9 is a schematic diagram of an arrangement of first electrodes according to another embodiment of the present application.

Please refer to FIGS. 7 to 9, in which FIG. 7 is a schematic diagram of an arrangement of first electrodes according to another embodiment of the present application; FIG. 8 is a schematic diagram of an arrangement of first electrodes according to another embodiment of the present application; and FIG. 9 is a schematic diagram of an arrangement of first electrodes according to another embodiment of the present application. In order to realize different arrangement forms of the first extension segments 111 of at least two adjacent first electrodes 1, in some optional embodiments, the first extension segments 111 of at least two adjacent first electrodes 1 are different from each other in at least one of extension track, shape, length d along the first direction Y, width c along the second direction X, and arrangement position.

It can be understood that, an extension track of the first extension segment 111 refers to a specific route when the first extension segment 111 extends along the first direction Y; a shape of the first extension segment 111 may specifically be a strip, a serpentine, a wave and so on; a length d along the first direction Y, and a width c along the second direction X refer to specific size of the first extension segment 111, and an arrangement position refers to a relative position of the first extension segment 111 in the entire first electrode 1. For example, the first extension segment 111 may be arranged close to one of the left and right sides of the first electrode 1, or arranged in a middle portion of the first electrode 1, which is not particularly limited herein.

By adjusting at least one of extension track, shape, length d along the first direction Y, width c along the second direction X, and arrangement position of the first extension segments 111 of at least two adjacent first electrodes 1, such that the first extension segments 111 of at least two adjacent first electrodes 1 are arranged in different forms. Optionally, only one factor of extension track, shape, length d along the first direction Y, width c along the second direction X, and arrangement position of the first extension segments 111 of at least two adjacent first electrodes 1 may be adjusted to simplify processing steps and facilitate manufacturing thereof. It is also possible to adjust multiple factors of extension track, shape, length d along the first direction Y, width c along the second direction X, and arrangement position of the first extension segments 111 of at least two adjacent first electrodes 1, so as to increase combinations of the arrangement forms of the first extension segments 111 of each first electrode 1, and enrich the types of arrangement forms of the first extension segments 111 of each first electrode 1.

As shown in FIG. 7, the extension track and shape of the first extension segments 111 of at least two adjacent first electrodes 1 are adjusted; as shown in FIG. 8, the width c of the first extension segments 111 of at least two adjacent first electrodes 1 along the second direction X are adjusted; and as shown in FIG. 9, the length d of the first extension segments 111 of at least two adjacent first electrodes 1 along the first direction Y are adjusted.

Optionally, at least one of extension track, shape, length along the first direction Y, width along the second direction X, and arrangement position of the second extension segments 211 of the second electrodes 2 may be adjusted, such that at least one of extension track, shape, length along the first direction Y, width along the second direction X, and arrangement position of the second extension segments 211 of the second electrodes 2 are different.

It can be understood that, only making the arrangement forms of the first extension segments 111 of at least two adjacent first electrodes 1 different can disrupt the regularity of light output from the display area of the corresponding adjacent first sub-pixels p1, thereby reducing Moire Pattern in corresponding position of the display device. Similarly, only making the arrangement forms of the second extension segments 211 of at least two adjacent second electrodes 2 different can disrupt the regularity of light output from the display area of the corresponding adjacent second sub-pixels p2, thereby reducing Moire Pattern in corresponding position of the display device. Therefore, with respect to the arrangement forms of the first extension segments 111 of the first electrodes 1, and the arrangement forms of the second extension segments 211 of the second electrodes 2, any one of the two may be adjusted or both of the two may be adjusted at the same time, which is not particularly limited herein.

Figure 10:
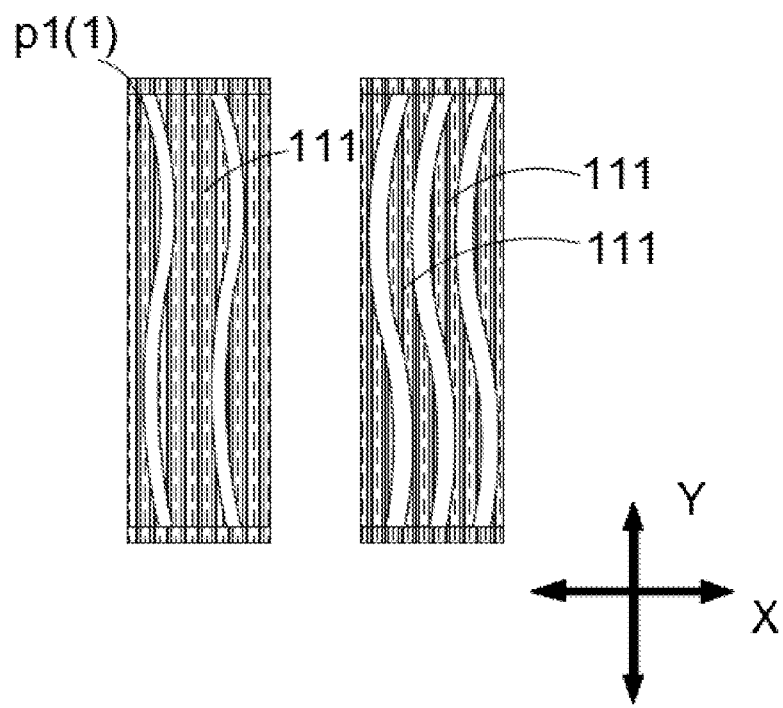
FIG. 10 is a schematic diagram of an arrangement of first electrodes according to another embodiment of the present application.

Please refer to FIG. 10, FIG. 10 is a schematic diagram of an arrangement of first electrodes 1 according to another embodiment of the present application. In some optional embodiments, numbers of the first extension segments 111 of the first electrodes 1 in at least two adjacent first sub-pixels p1 are different.

It can be understood that, when the numbers of the first extension segments 111 of the first electrodes 1 in at least two adjacent first sub-pixels p1 are different, the first extension parts 11 of the first electrodes 1 in corresponding adjacent first sub-pixels p1 are arranged in different forms. For example, the first electrode 1 in one first sub-pixel p1 may be provided with two first extension segments 111, and the first electrode 1 in another adjacent first sub-pixel p1 may be provided with three or any other number (excluding two) of the first extension segments 111. When the numbers of the first extension segments 111 are different, the corresponding first extension parts 11 are arranged in different forms, so as to change phase difference of light output from the adjacent first sub-pixels p1, disrupt interference condition, and reduce the occurrence of Moire Pattern.

Similarly, the phase difference of the light output from adjacent second sub-pixels p2 can also be changed by adjusting numbers of the second extension segments 211 of the second sub-pixels p2. Specifically, numbers of the second extension segments 211 of the second electrodes 2 in at least two adjacent second sub-pixels p2 are different.

Figure 11:
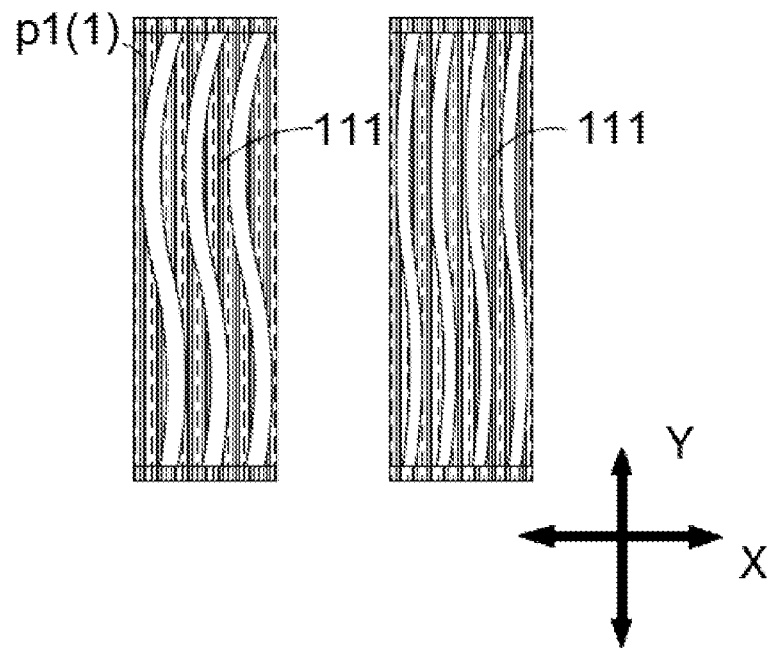
FIG. 11 is a schematic diagram of an arrangement of first electrodes according to another embodiment of the present application.

Please refer to FIG. 11, FIG. 11 is a schematic diagram of an arrangement of first electrodes 1 according to another embodiment of the present application. In order to facilitate the manufacturing, in some optional embodiments, numbers of the first extension segments 111 of at least two adjacent first electrodes 1 are in a coprime relationship.

It can be understood that, the situation that the numbers of the first extension segments 111 of at least two adjacent first electrodes 1 are different is irregular. Therefore, the adjacent first electrodes 1 cannot be manufactured according to a certain rule, and manufacturing process thereof is complicated. In this embodiment, by arranging numbers of the first extension segments 111 of at least two adjacent first electrodes 1 in a coprime relationship, the two adjacent first electrodes 1 can be manufactured according to a certain rule. That is, the numbers of the first extension segments 111 of two adjacent first electrodes 1 are in a coprime relationship, such as a combination of 2 and 3, 3 and 5, 5 and 7 and so on, to facilitate manufacturing thereof.

Optionally, numbers of the second extension segments 211 of at least two adjacent second electrodes 2 may be also in a coprime relationship, to facilitate manufacturing of the second electrodes 2.

Figure 12:
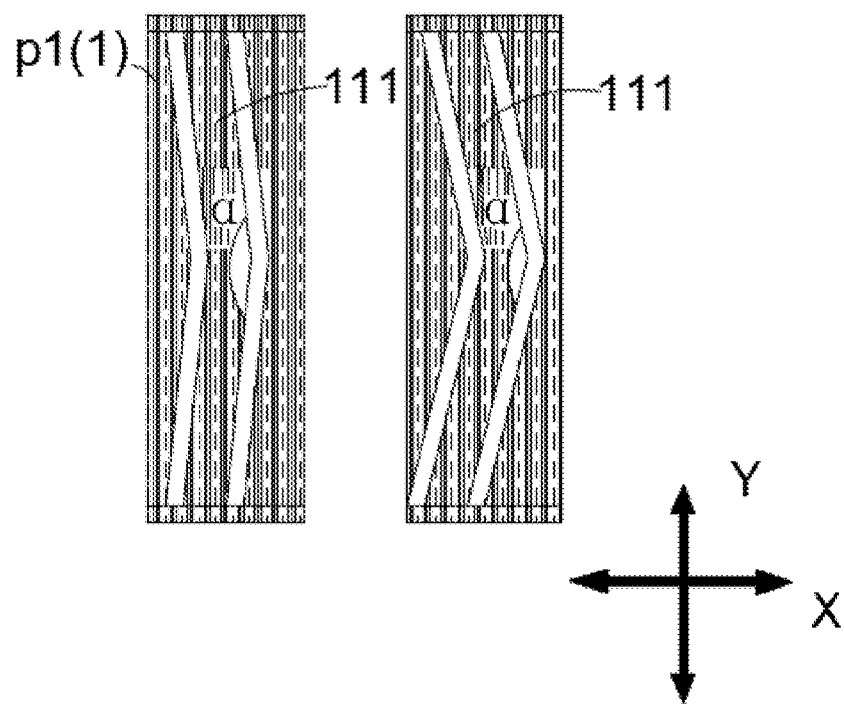
FIG. 12 is a schematic diagram of an arrangement of first electrodes according to another embodiment of the present application.

Please refer to FIG. 12, FIG. 12 is a schematic diagram of an arrangement of first electrodes 1 according to another embodiment of the present application. In some optional embodiments, the first extension segments 111 of at least two adjacent first electrodes 1 are fold lines, and a difference between maximum fold angles α of the first extension segments 111 of two adjacent first electrodes 1 is in a range from 5° to 15°.

It can be understood that, the first extension segment 111 with a fold line shape has at least one fold angle. When the first extension segment 111 has only one fold angle, a maximum fold angle α is this fold angle. When the first extension segment 111 has two or more fold angles, a largest one of these fold angles is the maximum fold angle α. In the to embodiment of the present application, the arrangement form of the first extension parts 11 can be changed by adjusting the fold angles of the first extension segments 111 of two adjacent first electrodes 1. Moreover, in order to ensure that the first electrodes 1 can be manufactured according to a certain rule, the difference between maximum fold angles α of the first extension segments 111 of two adjacent first electrodes 1 may be defined. For example, the difference between maximum fold angles α of the first extension segments 111 of two adjacent first electrodes 1 may adopt a fixed value, such as 5°, where 5° may be understood as ±5°. That is, a maximum fold angle α of a first extension segment 111 of a first electrode 1 can be increased by 5° or decreased by 5° relative to a maximum fold angle α of a first extension segment 111 of another adjacent first electrode 1.

Optionally, the second electrodes 2 can be arranged in a same form. That is, the second extension segments 211 of at least two adjacent second electrodes 2 are fold lines, and a difference between maximum fold angles of the second extension segments 211 of two adjacent second electrodes 2 is in a range from 5° to 15°. In this manner, the second electrodes 2 can be manufactured according to a certain rule to facilitate manufacturing of the second electrodes 2.

Figure 13:
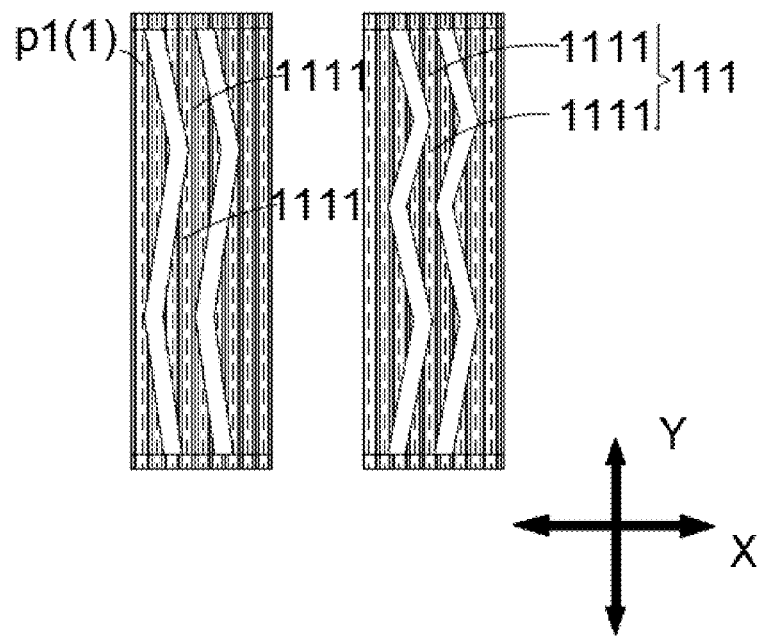
FIG. 13 is a schematic diagram of an arrangement of first electrodes according to another embodiment of the present application.

Please refer to FIG. 13, FIG. 13 is a schematic diagram of an arrangement of first electrodes 1 according to another embodiment of the present application. In some optional embodiments, the first extension segment 111 in a fold line shape includes at least three first sub-extension segments 1111 with different extension directions, and numbers of first sub-extension segments 1111 of the first extension segments 111 of two adjacent first electrodes 1 are different.

It can be understood that, when the numbers of first sub-extension segments 1111 of the first extension segments 111 in the fold line shape are different, the corresponding first extension parts 11 are also arranged in different forms. For example, when the number of the first sub-extension segments 1111 of one first extension segment 111 in the fold line shape is three, and the number of the first sub-extension segments 1111 of another adjacent first extension segment 111 in the fold line shape is four, the extension tracks of the two must be different. In this manner, the electric fields of the corresponding first electrodes 1 can be changed, and phase difference of light output from adjacent first sub-pixels p1 can be change to disrupt the interference conditions and reduce Moire Pattern.

Figure 14:
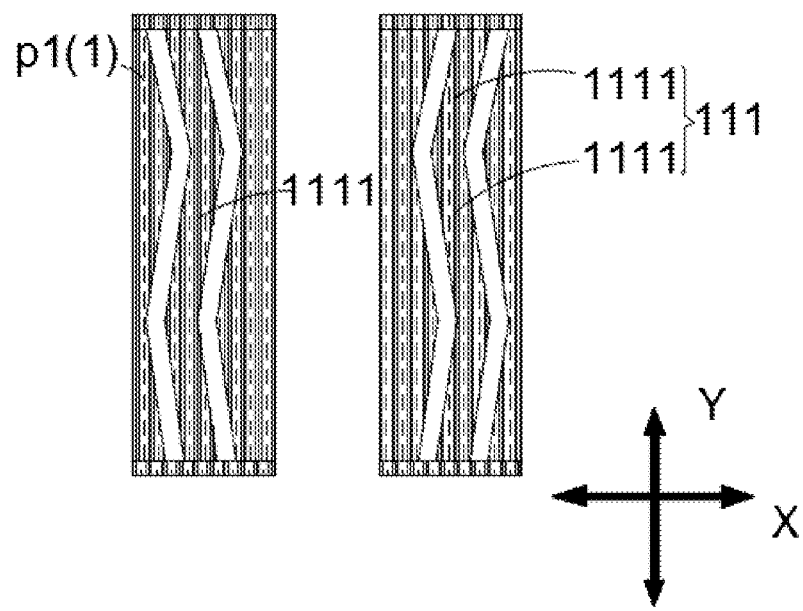
FIG. 14 is a schematic diagram of an arrangement of first electrodes according to another embodiment of the present application.

In addition to adjusting the numbers of the first sub-extension segments 1111 to change the arrangement form of the first extension parts 11, other aspects of the first sub-extension segments 1111 may also be adjusted. Please refer to FIG. 14, FIG. 14 is a schematic diagram of an arrangement of first electrodes 1 according to another embodiment of the present application. For example, extension directions of first sub-extension segments 1111 of the first extension segments 111 of two adjacent first electrodes 1 are different. The first extension segments 111 formed by the first sub-extension segments 1111 with different extension directions necessarily have different extension tracks, and thus the arrangement forms of the corresponding first extension parts 11 are different.

Figure 15:
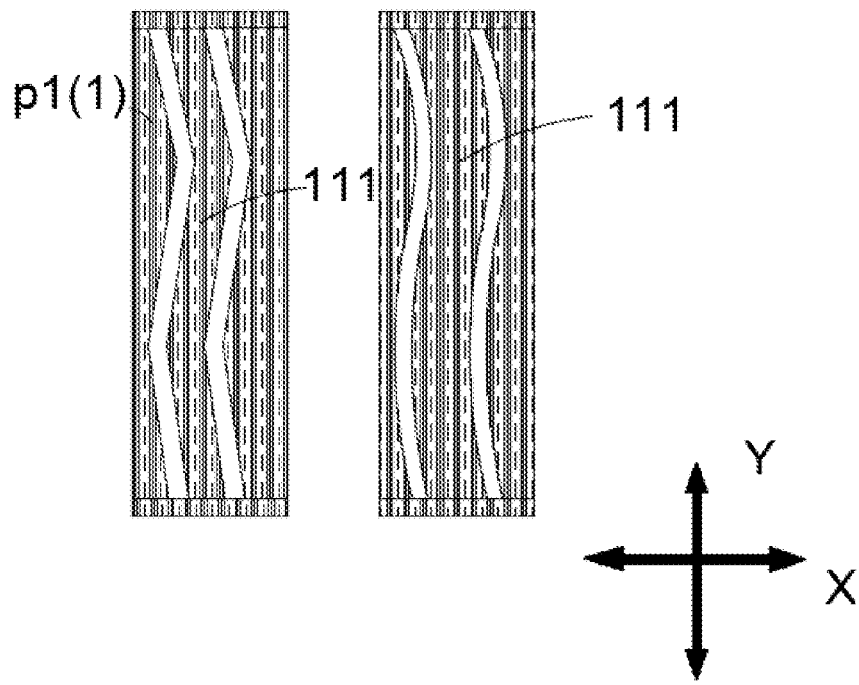
FIG. 15 is a schematic diagram of an arrangement of first electrodes according to another embodiment of the present application.

Please refer to FIG. 15, FIG. 15 is a schematic diagram of an arrangement of first electrodes 1 according to another embodiment of the present application. In some optional embodiments, the first extension segments 111 of one of at least two adjacent first electrodes 1 are fold lines, and the first extension segments 111 of the other are bending lines.

It can be understood that the first extension segment 111 in a fold line shape has a different shape and extension track from the first extension segment 111 in a bending line shape. Moreover, parameters such as number, extension direction, length of the first sub-extension segments 1111 of the first extension segment 111 in the fold line shape, and curvature of the first extension segment 111 in the bending line shape may be respectively adjusted to obtain the first extension segments 111 with different arrangement forms and further increase combinations of the first extension parts 11 with different arrangement forms.

Optionally, the second extension segments 211 of one of at least two adjacent second electrodes 2 are fold lines, and the second extension segments 211 of the other are bending lines, such that the second extension parts 21 of the corresponding second electrodes 2 are arranged in different forms.

Figure 16:
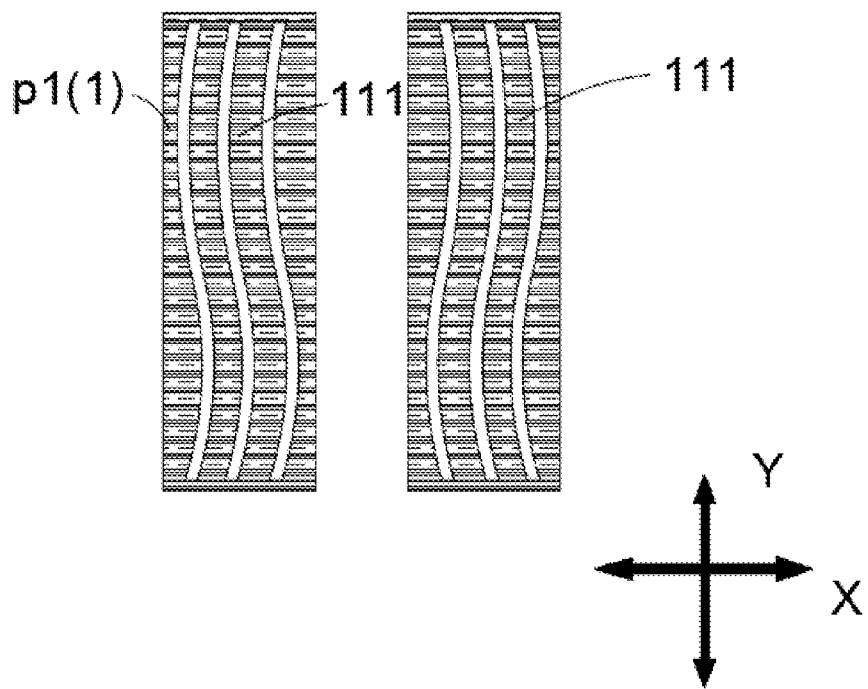
FIG. 16 is a schematic diagram of an arrangement of first electrodes according to another embodiment of the present application.

Please refer to FIG. 16, FIG. 16 is a schematic diagram of an arrangement of first electrodes 1 according to another embodiment of the present application. In some optional embodiments, the first extension segments 111 of at least two adjacent first electrodes 1 are bending lines, and bending directions of the first extension segments 111 of two adjacent first electrodes 1 are different; and/or the second extension segments 211 of at least two adjacent second electrodes 2 are bending lines, and bending directions of the second extension segments 211 of two adjacent second electrodes 2 are different.

In this embodiment, the first extension segments 111 in a bending line shape and the second extension segments 211 in a bending line shape may have one bending part or multiple bending parts, for example a wave shape, as long as the first extension segments 111 of two adjacent first electrodes 1 or the second extension segments 211 of two adjacent second electrodes 2 have a part with different bending directions. The different bending directions may be understood as that the bending parts of the first extension segments 111 protrude in different directions.

Figure 17:
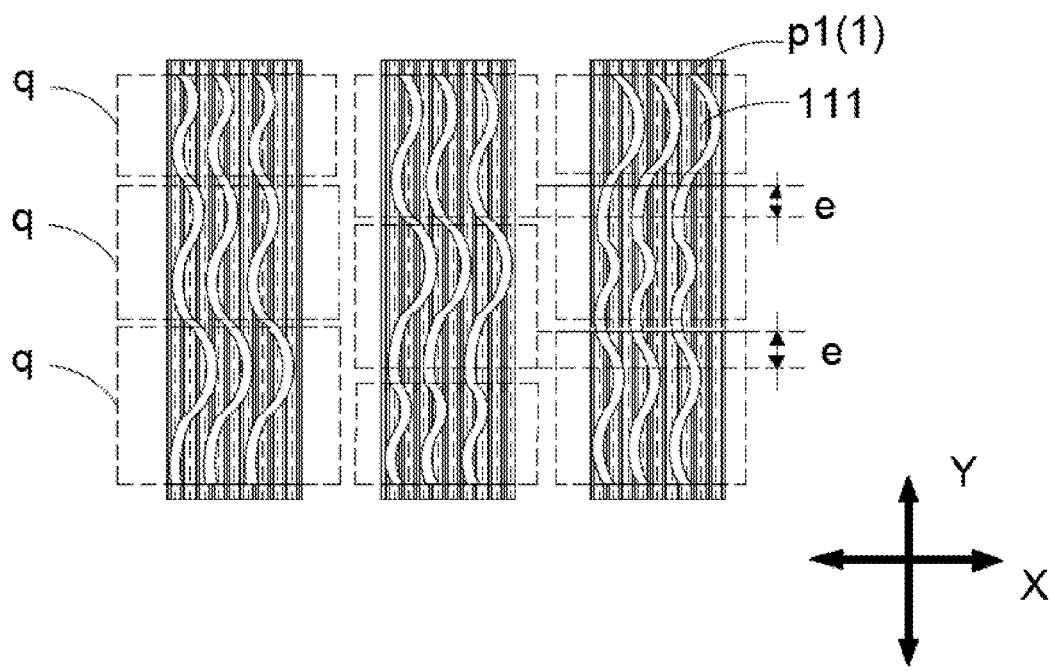
FIG. 17 is a schematic diagram of an arrangement of first electrodes according to another embodiment of the present application.

Please refer to FIG. 17, FIG. 17 is a schematic diagram of an arrangement of first electrodes 1 according to another embodiment of the present application. In some optional embodiments, the first extension segments 111 have wave shapes, each first extension segment 111 includes at least two bending segments q with different waveforms extending along the first direction Y, and in adjacent first electrodes 1 along the second direction X, bending segments q with a same waveform are partly staggered from each other in the first direction Y.

It can be understood that, the first extension segments 111 of each of the first electrodes 1 may have a same bending segment q. For example, the first extension segments 111 of two adjacent first electrodes 1 both have a first bending segment q and a second bending segment q, and the first bending segment q and the second bending segment q have different waveforms. First bending segments q of two adjacent first electrodes 1 are partly staggered from each other in the first direction Y, and second bending segments q of two adjacent first electrodes 1 are partly staggered from each other in the first direction Y. That is, the first extension segments 111 of each of the first electrodes 1 may have bending segments q with a same number and waveform, while bending segments q with a same waveform should be arranged partly staggered from each other in the first direction Y, such that the first extension parts 11 of adjacent first electrodes 1 along the second direction X are arranged in different forms.

Since the first extension segments 111 of each of the first electrodes 1 may have bending segments q with a same number and waveform, a corresponding mask can be manufactured conveniently, and a manufacturing cost of the first electrodes 1 can be reduced.

In order to further facilitate the manufacturing of the first electrodes 1, as shown in FIG. 17, in some optional embodiments, in adjacent first electrodes 1 along the second direction X, the bending segments q with a same waveform are staggered from each other by a same distance e in the first direction Y.

It can be understood that, when the bending segments q with the same waveform are staggered from each other by the same distance e in the first direction Y, a corresponding mask can be manufactured according to a determined size standard and a certain rule, and the first electrodes 1 can be manufactured conveniently.

Optionally, the first extension segment 111 of each first electrode 1 can be understood as a part taken from a pre-designed waveform, and the part of the first extension segment 111 of a first electrode 1 partly overlaps with the part of the first extension segment 111 of an adjacent first electrode 1. In this manner, in adjacent first electrodes 1 along the second direction X, the bending segments q with a same waveform are partly staggered from each other in the first direction Y.

Figure 18:
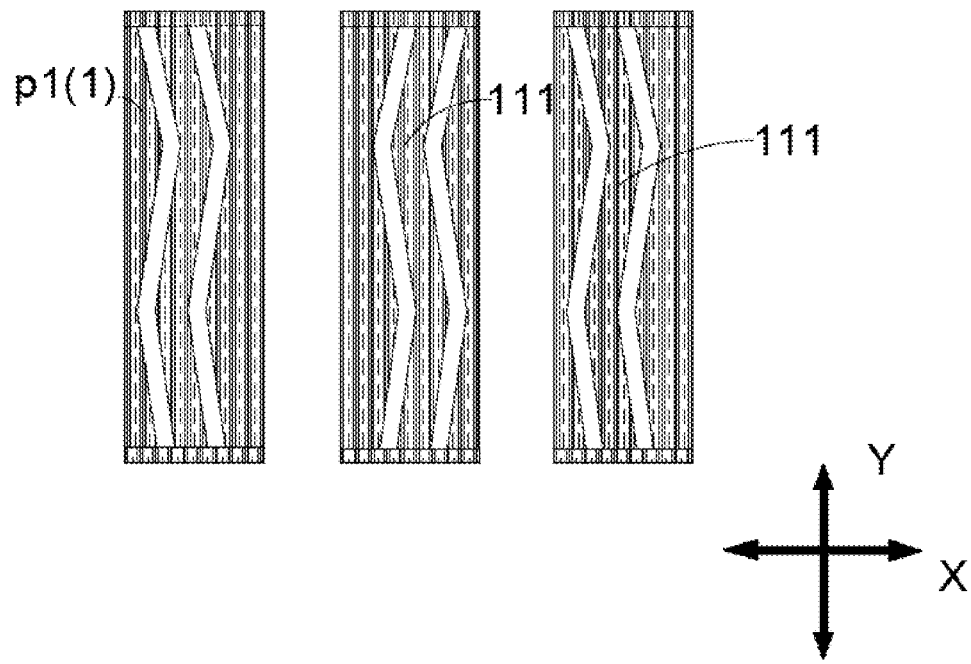
FIG. 18 is a schematic diagram of an arrangement of first electrodes according to another embodiment of the present application.

Please refer to FIG. 18, FIG. 18 is a schematic diagram of an arrangement of first electrodes 1 according to another embodiment of the present application. In some optional embodiments, within one single first electrode 1, the first extension segments 111 are asymmetrically arranged with respect to a center of the first electrode 1, and the first extension segments 111 of two adjacent first electrodes 1 are symmetrically arranged with respect to a center of the two adjacent first electrodes 1; and/or within one single second electrode 2, the second extension segments 211 are asymmetrically arranged with respect to a center of the second electrode 2, and the second extension segments 211 of two adjacent second electrodes 2 are symmetrically arranged with respect to a center of the two adjacent second electrodes 2.

It can be understood that, the first extension segments 111 may offset by a certain distance along the second direction X with respect to the center of the first electrode 1. For example, the first extension segments 111 may offset to a left side or a right side with respect to the first electrode 1 to realize asymmetric arrangement. When each of the first extension segments 111 of two adjacent first electrodes 1 are symmetrically arranged with respect to a center of the two adjacent first electrodes 1, since within one single first electrode 1, the first extension segments 111 are asymmetrically arranged with respect to a center of the first electrode 1, the first extension segments 111 of two adjacent first electrodes 1 symmetrically arranged with respect to the center of the two adjacent first electrodes 1 are arranged in different forms. For example, when the first extension segments 111 in a first electrode 1 may offset to a left side with respect to a center of the first electrode 1, the first extension segments 111 in another first electrode 1 may offset to a right side with respect to a center of the first electrode 1, and the first extension segments 111 of the two first electrodes 1 may be symmetrically arranged with respect to a center of the two adjacent first electrodes 1.

Similarly, the second electrodes 2 may also adopt the same arrangement form as the first electrodes 1, which is not particularly limited herein.

Figure 19:
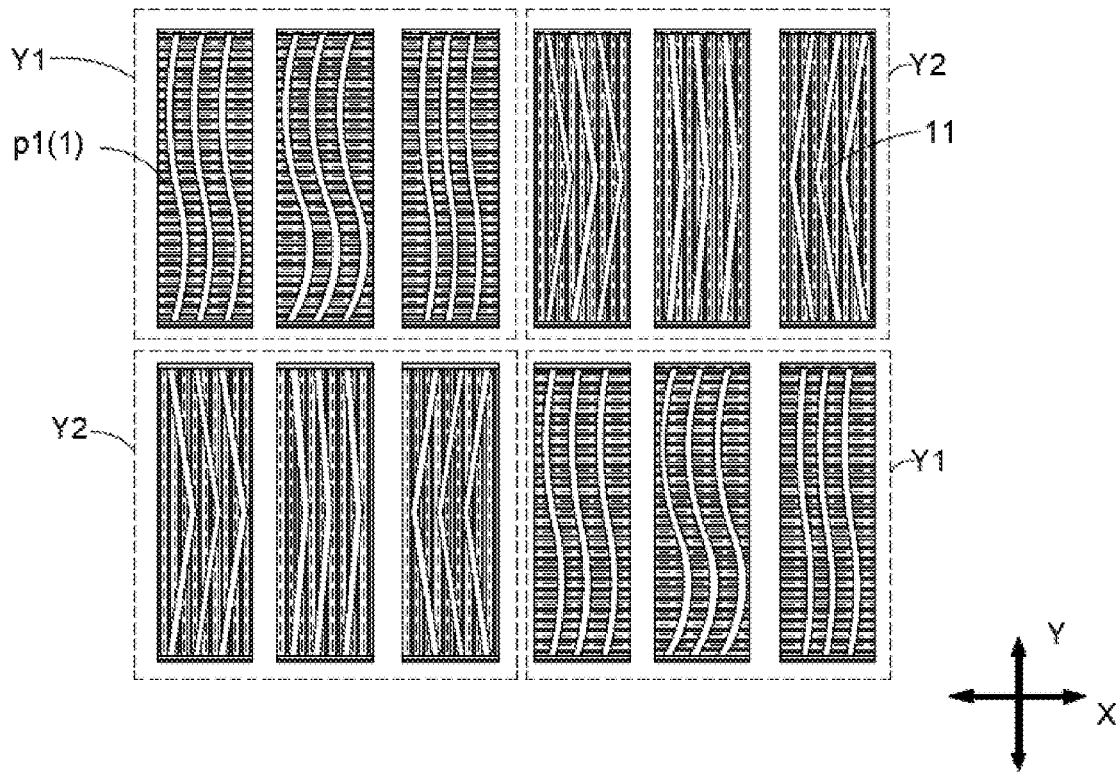
FIG. 19 is a schematic diagram of an arrangement of first electrodes according to another embodiment of the present application.

Please refer to FIG. 19, FIG. 19 is a schematic diagram of an arrangement of first electrodes 1 according to another embodiment of the present application. In some optional embodiments, the display device further includes a first extension part group Y1 and a second extension part group Y2, wherein the first extension part group Y1 and the second extension part group Y2 both include at least two adjacent first sub-pixels p1. An arrangement form of the first extension parts 11 of the first electrodes 1 of the first sub-pixels p1 in the first extension part group Y1 is different from an arrangement form of the first extension parts 11 of the first electrodes 1 of the first sub-pixels p1 in the second extension part group Y2, and the first extension part group Y1 and the second extension part group Y2 are alternately arranged along the first direction Y and the second direction X respectively.

It should be noted that, the first extension parts 11 of the first electrodes 1 of each of the first sub-pixels p1 in one first extension part group Y1 may be arranged in a same form or in different forms, which is not particularly limited herein.

The first extension part group Y1 and the second extension part group Y2 are alternately arranged along the first direction Y and the second direction X respectively. That is, the first extension part group Y1 and the second extension part group Y2 are arranged in an array along the first direction Y, and arranged in an array along the second direction X. In addition, the first extension part group Y1 and the second extension part group Y2 are arranged adjacently. The arrangement form of the first extension parts 11 of the first electrodes 1 of the first sub-pixels p1 in the first extension part group Y1 is different from the arrangement form of the first extension parts 11 of the first electrodes 1 of the first sub-pixels p1 in the second extension part group Y2. That is, a light-emitting effect of a display area corresponding to the first extension part group Y1 is different from a light-emitting effect of a display area corresponding to the second extension part group Y2, and thus Moire Pattern in display areas corresponding to the first extension part group Y1 and the second extension part group Y2 can be reduced.

In this embodiment, by setting the arrangement form of the first extension parts 11 of the first electrodes 1 of the first sub-pixels p1 in the first extension part group Y1 different from the arrangement form of the first extension parts 11 of the first electrodes 1 of the first sub-pixels p1 in the second extension part group Y2, setting the first extension parts 11 of the first electrodes 1 of the first sub-pixels p1 in each first extension part group Y1 being arranged in a same form, and setting the first extension parts 11 of the first electrodes 1 of the first sub-pixels p1 in each second extension part group Y2 being arranged in a same form, masks corresponding to the first extension part group Y1 and the second extension part group to Y2 can be manufactured conveniently, and manufacturing cost thereof can be reduced.

Figure 20:
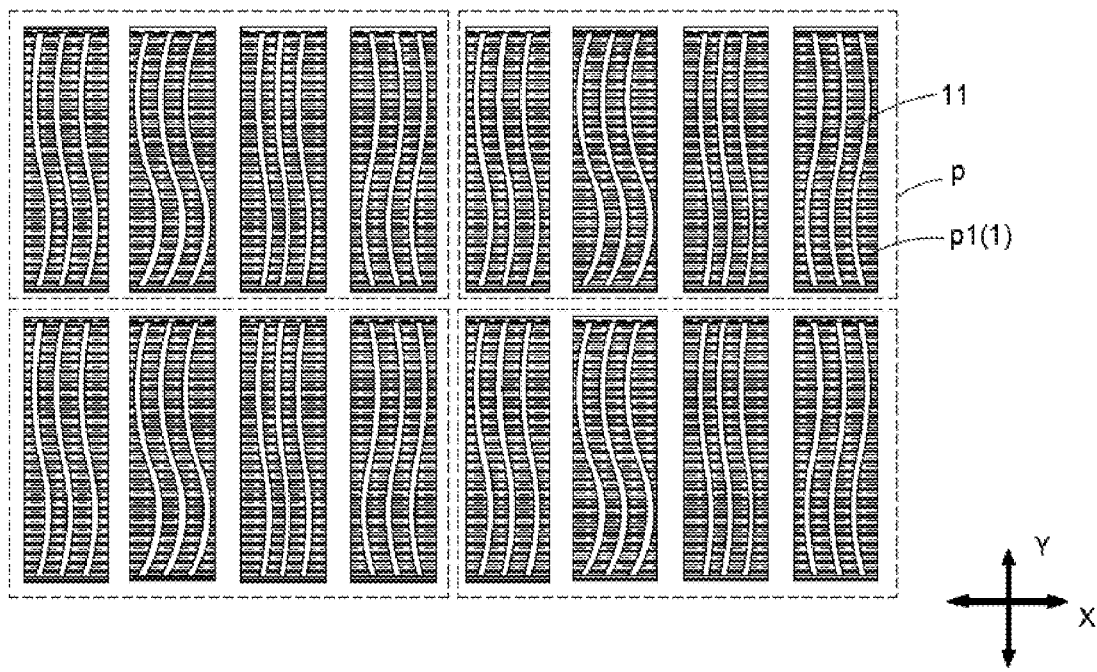
FIG. 20 is a schematic diagram of an arrangement of first electrodes according to another embodiment of the present application.

Please refer to FIG. 20, FIG. 20 is a schematic diagram of an arrangement of first electrodes 1 according to another embodiment of the present application. In some optional embodiments, the first panel 10 includes first sub-pixels p1 of M colors, and adjacent N first sub-pixels p1 along the second direction X form a pixel set p. The first extension parts 11 of the first electrodes 1 of the first sub-pixels P1 in the pixel set P are arranged in different forms. N is a positive integer that is not an integer multiple of M, and N≥4, M≥3.

It should be noted that, the pixel set p only includes N adjacent first sub-pixels p1 with different arrangement forms of the first extension parts 11, and adjacent first sub-pixels p1 of M colors form a pixel unit. The following factors are mainly considered when N is set as a positive integer that is not an integer multiple of M. A radiation range of a same incident light and its reflected light is relatively small, which is usually a range of several adjacent first sub-pixels p1. The greater a number of first sub-pixels p1 in the pixel set p is, that is, the greater N is, the less likely the pixel set p is radiated by a same incident light and its reflected light, and the less likely the interference occurs, thereby reducing the occurrence of Moire Pattern. In addition, since the probability of the interference dart parts being identified decreases as a distance between the first sub-pixels p1 increases, the more the number of first sub-pixels p1 in the pixel set p is, the larger a distance between the two outermost first sub-pixels p1 will be, and the lower a probability of the interference dart parts being identified will become, which means that Moire Pattern is not easily perceived by human eye. Another factor is that a transmittance of the first sub-pixels p1 also changes when the arrangement form of the first extension parts 11 changes. If N is just an integer multiple of M, that is, a complete pixel unit, for example, when M=3, the first panel 10 includes first sub-pixels p1 of red, green, and blue colors to form an RGB pixel unit, there may be uneven color mixing, which would lead to color shift problem. In order to avoid the above problems, it is necessary to set N as a positive integer that is not an integer multiple of M. For example, when M=3, N=4 or N=5.

As shown in FIG. 20, in some optional embodiments, the first panel 10 includes first sub-pixels p1 of 3 colors, adjacent 4 first sub-pixels p1 along the second direction X form a pixel set p.

It can be understood that, the first sub-pixels p1 of 3 colors may specifically be the first sub-pixels p1 of the above-mentioned three colors of red, green, and blue, so that the first sub-pixels p1 of different colors are mixed with each other to realize color display. The adjacent 4 first sub-pixels p1 form the pixel set p, that is, when M=3, N=4, so as to avoid the problem of uneven color mixing in the display device.

Figure 21:
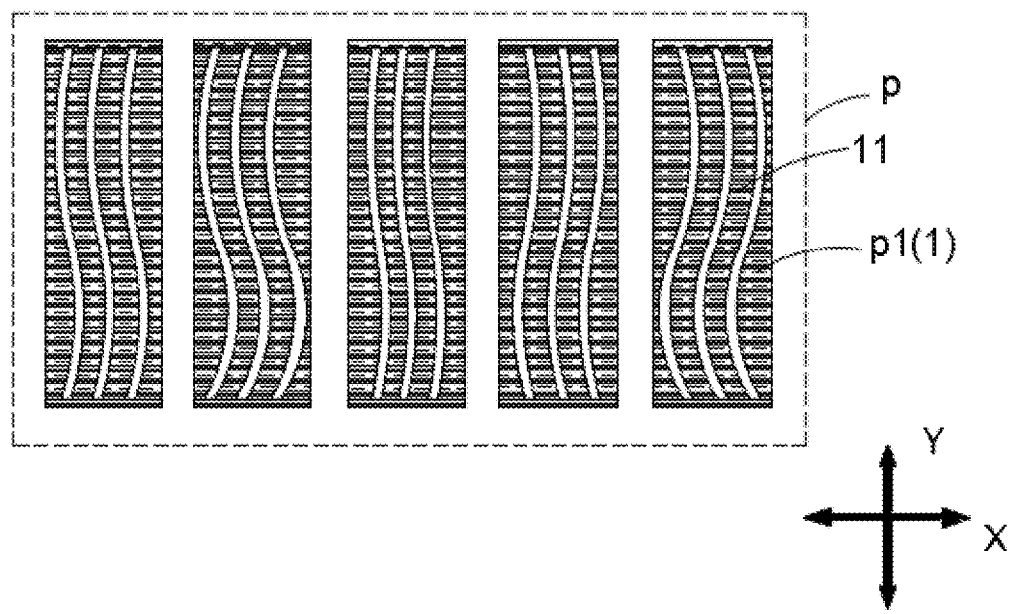
FIG. 21 is a schematic diagram of an arrangement of first electrodes according to another embodiment of the present application.

Please refer to FIG. 21, FIG. 21 is a schematic diagram of an arrangement of first electrodes 1 according to another embodiment of the present application. Optionally, the first panel 10 includes first sub-pixels p1 of 4 colors, adjacent 5 first sub-pixels p1 along the second direction X form a pixel set p. That is, when M=4 and N=5, the first sub-pixels p1 of 4 colors may specifically include first sub-pixels p1 of red, green, blue, white, or red, green, blue, yellow, or other color combinations, and can be selected according actual needs, which is not particularly limited herein. Optionally, the number of the first sub-pixels p1 in each pixel set p is not particularly limited, and may also be 6, 7, 8, and so on.

Figure 22:
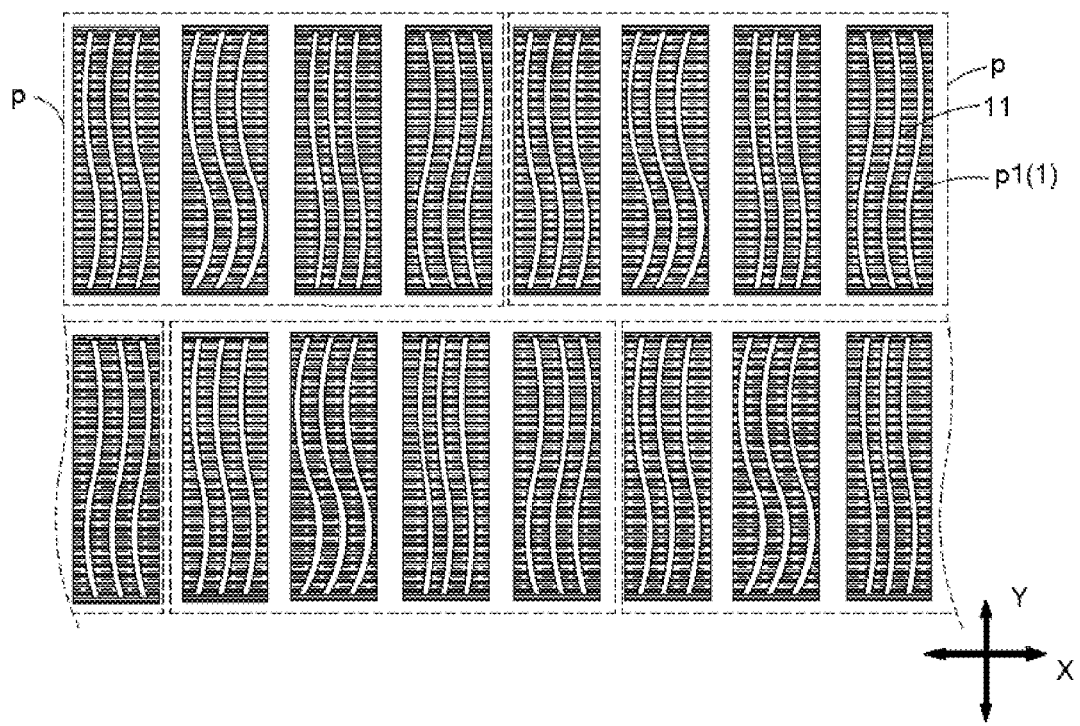
FIG. 22 is a schematic diagram of an arrangement of first electrodes according to another embodiment of the present application.

Please refer to FIG. 22, FIG. 22 is a schematic diagram of an arrangement of first electrodes 1 according to another embodiment of the present application. In some optional embodiments, two same pixel sets p are arranged partly overlapped and partly staggered along the first direction Y.

The partly overlapped and partly staggered arrangement specifically means that the two same pixel sets p are not completely staggered along the first direction Y. The two same pixel sets p are staggered by a certain distance along the first direction Y. One part of the two same pixel sets p are overlapped, and the other part thereof are staggered from each other. By making the two same pixel sets p being arranged partly overlapped and partly staggered along the first direction Y, it can be avoided that the first sub-pixels p1 with the same arrangement form of the first extension parts 11 in the two same pixel sets p are arranged adjacently. That is, for the two same pixel sets p, the first extension parts 11 of adjacent first sub-pixels p1 are arranged in different forms, so as to change phase difference of light output from adjacent first sub-pixels p1, disrupt interference conditions, and reduce the occurrence of Moire Pattern.

Of course, two same pixel sets p may be arranged partly overlapped and partly staggered along the second direction X, which is not particularly limited herein.

Figure 23:
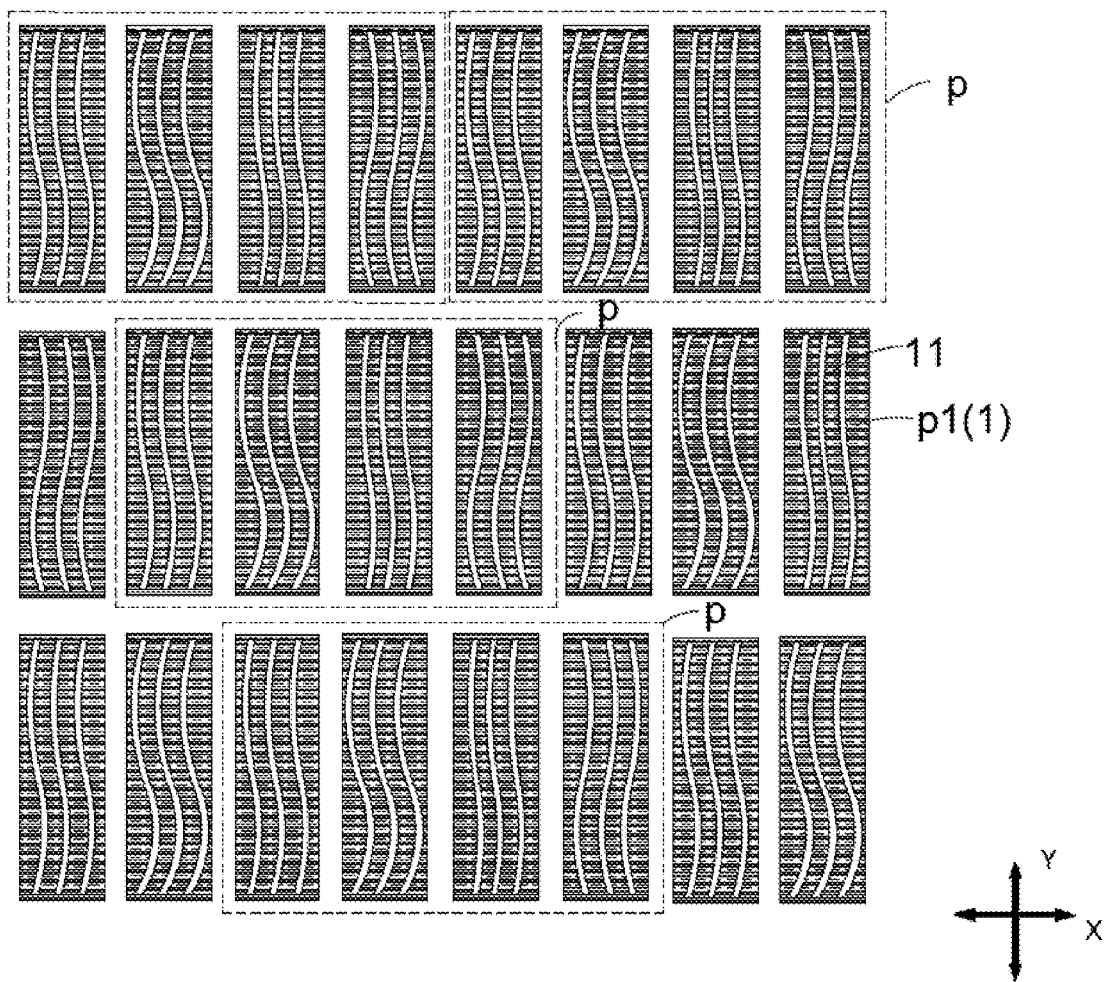
FIG. 23 is a schematic diagram of an arrangement of first electrodes according to another embodiment of the present application.

Please refer to FIG. 23, FIG. 23 is a schematic diagram of an arrangement of first electrodes 1 according to another embodiment of the present application. In some optional embodiments, L adjacent pixel sets p along the first direction Y are arranged partly overlapped and partly staggered along the second direction X, and wherein L≤N, and L is a positive integer≥2.

It should be noted that, in the present embodiment, the first extension parts 11 in each of the pixel sets p may be arranged in a same form to facilitate manufacturing thereof. In order to avoid the condition that in L adjacent pixel sets p along the first direction Y, the first sub-pixels p1 with a same arrangement form along the second direction X are arranged adjacent to each other, a distance by which the L adjacent pixel sets p along the first direction Y being arranged staggered along the second direction X may be greater than or equal to a length of one second sub-pixel p2 along the second direction X. By setting L≤N, that is, a number of adjacent pixel sets p along the first direction Y is less than or equal to a number of first sub-pixels p1 included in each pixel set p, such that L adjacent pixel sets p can be arranged staggered along the second direction X for at least the length of one second sub-pixel p2 along the second direction X. Optionally, L adjacent pixel sets p along the first direction Y can be arranged staggered along the second direction X on after another for the length of one second sub-pixel p2 along the second direction X, such that the pixel sets p are arranged according to a certain rule to facilitate the manufacturing thereof.

Figure 24:
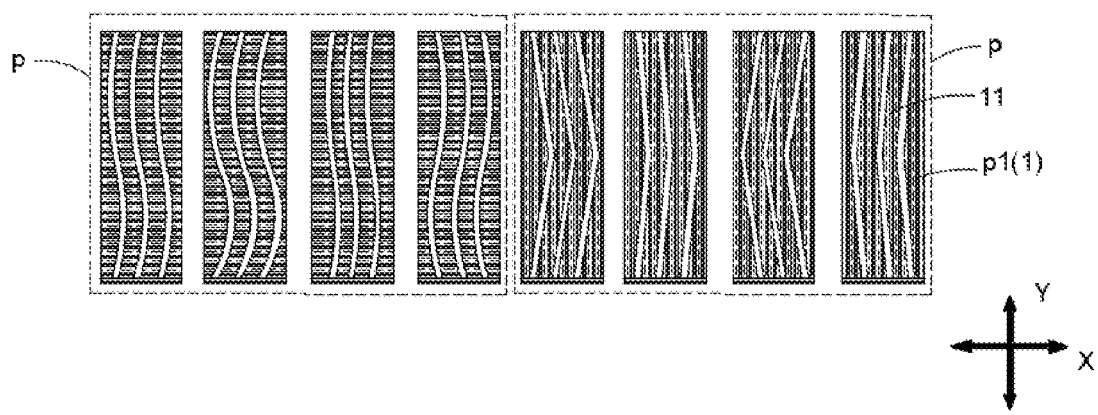
FIG. 24 is a schematic diagram of an arrangement of first electrodes according to another embodiment of the present application.

Please refer to FIG. 24, FIG. 24 is a schematic diagram of an arrangement of first electrodes 1 according to another embodiment of the present application. In some optional embodiments, the first extension parts 11 in two adjacent pixel sets p are arranged in different forms.

In this embodiment, since each pixel set p includes N first sub-pixels p1, and N≥4, each pixel set p includes a plurality of first extension parts 11 of the first electrodes 1. The arrangement form of one single first extension part 11 or multiple first extension parts 11 may be adjusted, such that the first extension parts 11 in two adjacent pixel sets p are arranged in different forms, which is not particularly limited herein. In this manner, the light-emitting effects of display areas corresponding to two adjacent pixel sets p are different, and thus the Moire Pattern of the display areas corresponding to the two adjacent pixel sets p can be reduced.

Figure 25:
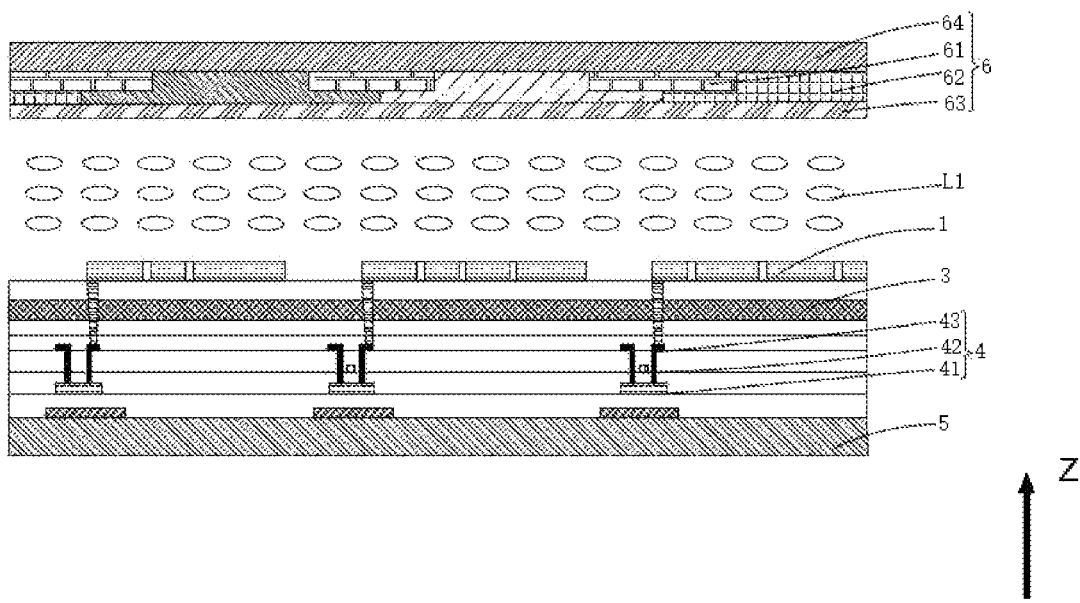
FIG. 25 is a schematic structural diagram of film layers of a first panel according to an embodiment of the present application.

Please refer to FIG. 25, FIG. 25 is a schematic structural diagram of film layers of a first panel 10 according to an embodiment of the present application. In some optional embodiments, the first sub-pixel p1 is further provided with a third electrode 3 opposite to the first electrode 1 and a first liquid crystal layer L1, and the first electrode 1 and the third electrode 3 form an electric field to drive liquid crystal molecules in the first liquid crystal layer L1 to deflect.

It should be noted that, the liquid crystal molecules are anisotropic, and a refractive index of a long axis is different from a refractive index of a short axis. Therefore, to birefringence effect will occur when light passes through liquid crystal. When the first extension parts 11 are arranged in different forms, deflection angles of the liquid crystal are different, which causes change of refractive index. According to phase difference formula $\Delta\Phi=2\pi*(n_2r_2-n_1r_1)/\lambda$, where $n_1$ and $n_2$ are refractive indexes at the first liquid crystal layer L1 through which a same incident light and its reflected light pass, respectively, $r_1$ and $r_2$ are the wave paths of the same incident light and its reflected light, respectively, and $\lambda$ is wavelength. When the refractive index changes, phase difference of the light passing through the adjacent first sub-pixels p1 will change, so as to disrupt the interference conditions and reduce the occurrence of Moire Pattern.

Figure 26:
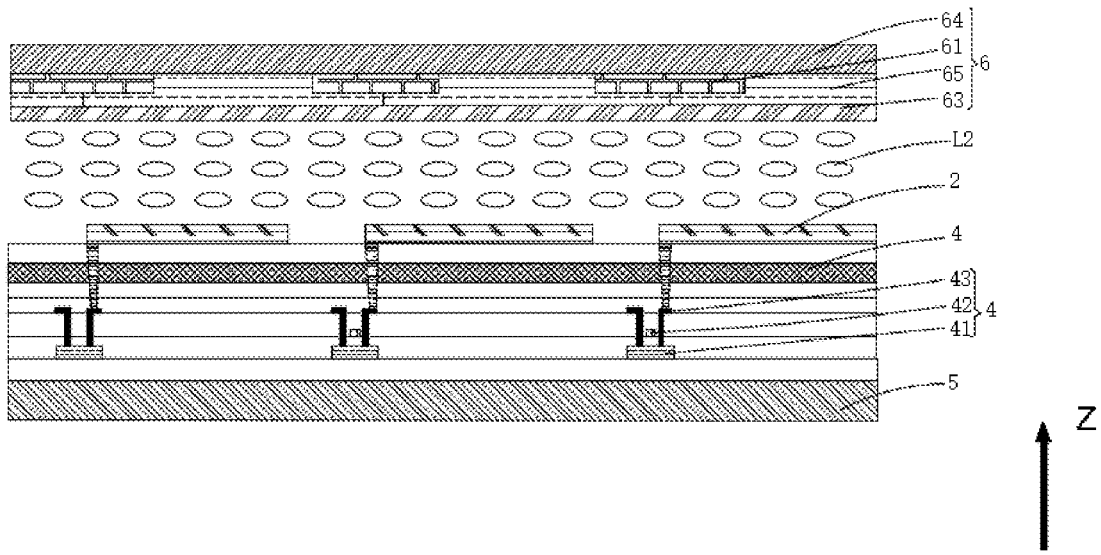
FIG. 26 is a schematic structural diagram of film layers of a second panel according to an embodiment of the present application.

Similarly, please refer to FIG. 26, FIG. 26 is a schematic structural diagram of film layers of a second panel 20 according to an embodiment of the present application. The second sub-pixel p2 is further provided with a fourth electrode 4 opposite to the second electrode 2 and a second liquid crystal layer L2, and the second electrode 2 and the fourth electrode 4 form an electric field to drive liquid crystal molecules in the second liquid crystal layer L2 to deflect.

By adjusting the arrangement form of the second extension part 21 to change the angle of the liquid crystal molecules of the second liquid crystal layer L2 at the corresponding position, thereby changing the refractive index of the liquid crystal molecules, the phase difference of the light output from the adjacent second sub-pixels p2 can be changed, so as to disrupt the interference conditions and reduce the occurrence of Moire Pattern.

Optionally, the first electrode 1 is a pixel electrode, and the third electrode 3 is a common electrode. The first electrode 1 may be provided on one side of the third electrode 3 facing the first liquid crystal layer L1, or the first electrode 1 may be provided on the other side of the third electrode 3 away from the first liquid crystal layer L1, which is not particularly limited herein. Similarly, the second electrode 2 is a pixel electrode, and the fourth electrode 4 is a common electrode. The second electrode 2 may be provided on one side of the fourth electrode 4 facing the second liquid crystal layer L2, or the second electrode 2 may be provided on the other side of the fourth electrode 4 away from the second liquid crystal layer L2.

Figure 27:
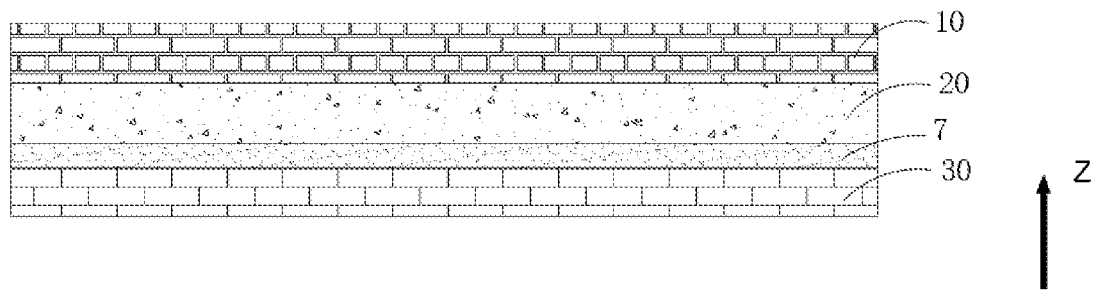
FIG. 27 is a schematic structural diagram of a display device according to another embodiment of the present application.
Figure 28:
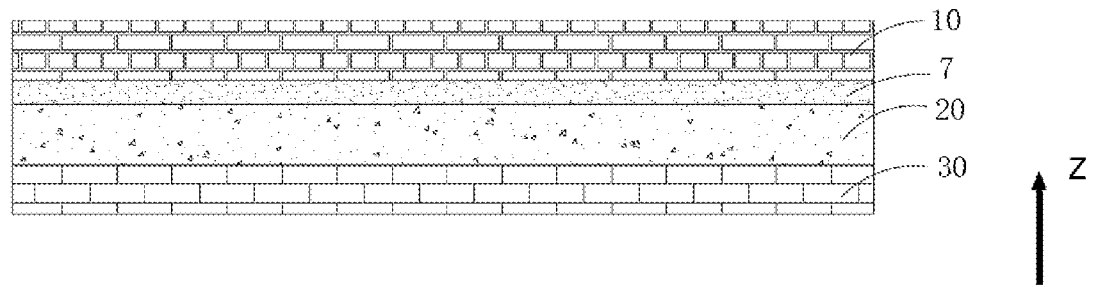
FIG. 28 is a schematic structural diagram of a display device according to another embodiment of the present application.

Since the arrangement forms of the first extension parts 11 and/or the second extension parts 21 is adjusted in the embodiment of the present application, transmittance of the first electrodes 1 and/or the second electrodes 2 is affected, which will sacrifice a part of transmittance of the display device. In order to solve the above problems, please refer to FIG. 27 and FIG. 28. FIG. 27 is a schematic structural diagram of a display device according to another embodiment of the present application. FIG. 28 is a schematic structural diagram of a display device according to another embodiment of the present application. In some optional embodiments, the display device further includes a backlight module 30 and a brightness enhancement film 7, wherein the backlight module 30 is arranged on a side of the second panel 20 away from the first panel 10, and the brightness enhancement film 7 is arranged between the backlight module 30 and the second panel 20; and/or wherein the brightness enhancement film 7 is arranged between the first panel 10 and the second panel 20.

It can be understood that, when the brightness enhancement film 7 is arranged between the backlight module 30 and the second panel 20, an intensity of light entering the second panel 20 from the backlight module 30 can be increased; and when the brightness enhancement film 7 is arranged between the first panel 10 and the second panel 20, an intensity of light entering the first panel 10 from the second panel 20 can be increased. Specifically, the brightness enhancement film 7 (BEF), also known as a prism sheet or a condensing sheet, is a film or sheet that can improve the luminous efficiency of the entire backlight module 30 in the display device. Using special prism structure of the brightness enhancement film 7, light in all directions can be concentrated to a central viewing angle according to optical principles such as refraction, total reflection, light accumulation, thereby improving brightness of the display device and controlling viewing angle thereof.

Figure 29:
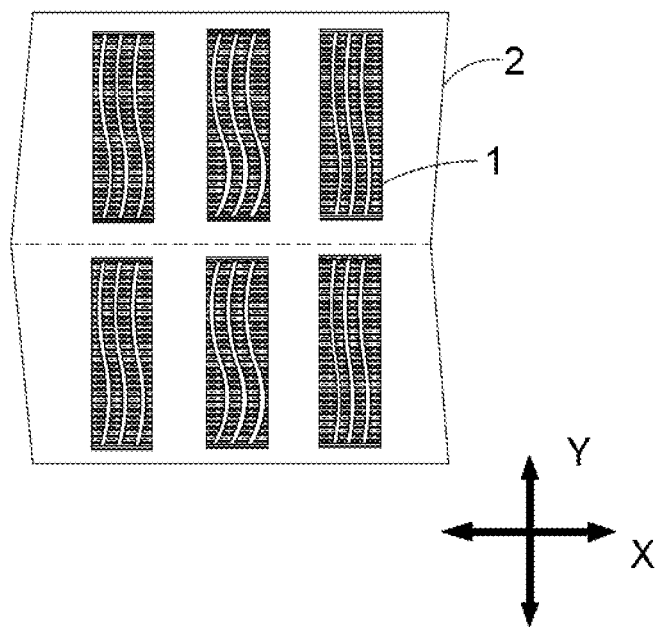
FIG. 29 is a schematic diagram of relative positions of a first electrode and a second electrode according to an embodiment of the present application.

Please refer to FIG. 29, FIG. 29 is a schematic diagram of relative positions of a first electrode and a second electrode according to an embodiment of the present application. In some optional embodiments, a maximum size of the first electrode 1 along the first direction Y or the second direction X is respectively smaller than a maximum size of the second electrode 2 along the first direction Y or the second direction X.

It should be noted that, by setting the second electrode 2 larger than the first electrode 1, the first electrode 1 and the second electrode 2 can be avoided from being arranged in a one-to-one correspondence, which reduces the requirements on the manufacturing process accuracy and alignment accuracy, and facilitates manufacturing thereof. In addition, the second electrode 2 is larger than the first electrode 1, which can also reduce required number of the second electrodes 2 and reduce production cost.

It should be noted that, one of the purposes of making the dual-panel display device is to improve contrast ratio. Since the OLED display panel itself has a high contrast ratio, while the liquid crystal display panel itself has a relatively low contrast ratio, the dual-panel display device is mainly used for the combination of the liquid crystal display panels to improve the overall contrast ratio. That is, both the first panel 10 and the second panel 20 are liquid crystal display panels. However, the embodiments of the present application do not exclude other combinations. For example, the first panel 10 adopts an OLED display panel, and the second panel 20 adopts a liquid crystal display panel. Thus, the OLED display panel as the first panel 10 can be used to greatly improve an overall contrast ratio of the display device, and a higher contrast ratio can be obtained than a combination of two liquid crystal display panels. In addition, other combinations, such as the first panel 10 adopting a liquid crystal display panel, and the second panel 20 adopting an OLED display panel, are also applicable to the technical solutions of the present application, which are all within the protection scope of the present application, and will not be repeated here.

The first panel 10 and the second panel 20 may specifically be liquid crystal display panels with liquid crystal layers such as TN (Twisted Nematic) type liquid crystal, FFS (Fringe Field Switching) type liquid crystal, dye liquid crystal, polymer dispersed liquid crystal, and so on. They can be applied to the embodiments of the present application, and all should be within the protection scope of the present application.

As shown in FIGS. 25 and 26, optionally, the first panel 10 includes a color liquid crystal panel, and the second panel 20 includes a black and white liquid crystal panel. The color liquid crystal panel includes an array substrate, a first liquid crystal layer L1 and a color filter substrate 6 that are stacked arranged. The black and white liquid crystal panel includes an array substrate 5, a second liquid crystal layer L2 and a color filter substrate 6 that are stacked arranged.

The color filter substrate 6 includes a substrate 64, a black matrix 61, a color resist and a flat layer 63. The color resist of the black and white liquid crystal panel is transparent color resist 65, such as OC glue. The color resist of the color liquid crystal panel is colored color resist 62, which may specifically include red, blue, green color resists, and so on.

The first panel 10 and the second panel 20 further include a plurality of thin film transistors 4, each of which includes an active layer 41, a gate 42, and a source and drain layer 43 stacked along a light output direction Z of the display device. Each of the first electrodes 1 and each of the second electrodes 2 are respectively connected to drains of the source and drain layers 43 of each of the thin film transistors 4 in a one-to-one correspondence. It should be noted that, the thin film transistor 4 in this application is described by taking a top gate structure as an example. In some other embodiments of the present application, the thin film transistor 4 may also be embodied in a bottom gate structure or a double gate structure, which is not specifically limited in this application.

When the first panel 10 includes a color liquid crystal panel, since the first panel includes a plurality of first sub-pixels p1 with different colors, and the size of the first sub-pixels p1 is smaller than that of the second sub-pixels p2, interference is more likely to occur between the light beams emitted from the first sub-pixels p1 of the first panel 10. In order to solve the above problem, optionally, in the first panel 10, first extension parts 11 of first electrodes 1 of at least two adjacent first sub-pixels p1 are arranged in different forms. The first extension parts 11 of first electrodes 1 of at least two adjacent first sub-pixels p1 are arranged in different forms, so as to change phase difference of light output from adjacent first sub-pixels p1, disrupt interference conditions, and reduce the occurrence of Moire Pattern.

Please refer to FIG. 29, in some optional embodiments, an orthographic projection of one single second electrode 2 on the first panel 10 covers at least two first electrodes 1.

It can be understood that, since the second panel 20 plays a dimming function, in order to facilitate control and increase a dimming range of one single second sub-pixel p2, the orthographic projection of one single second electrode 2 on the first panel 10 can be arranged to cover at least two first electrodes 1. For example, generally the orthographic projection of one single second electrode 2 on the first panel 10 covers six or eight first electrodes 1, such that one single second electrode 2 is responsible for dimming of the six or eight first electrodes 1 to reduce producing and controlling difficulty, and facilitate manufacturing thereof.

Figure 30:
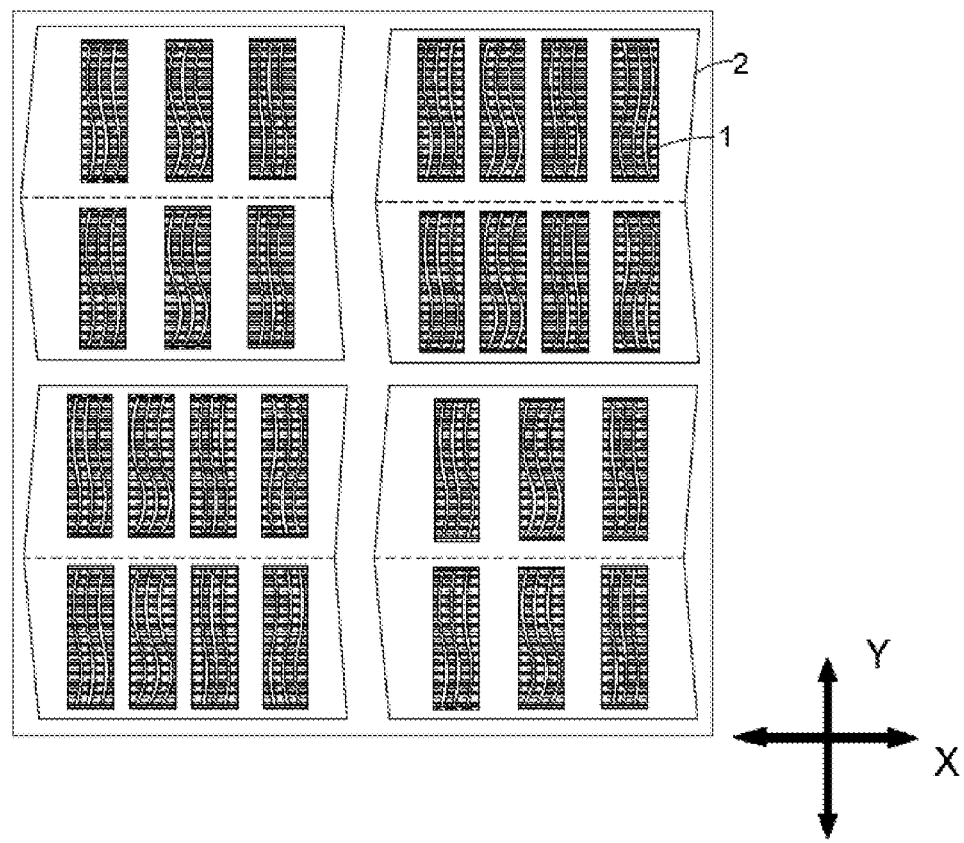
FIG. 30 is a schematic diagram of relative positions of a first electrode and a second electrode according to another embodiment of the present application.

Please refer to FIG. 30, FIG. 30 is a schematic diagram of relative positions of a first electrode 1 and a second electrode 2 according to another embodiment of the present application. In some optional embodiments, numbers of the first electrodes 1 covered by orthographic projections of two adjacent second electrodes 2 along the first direction Y on the first panel 10 are different; and/or numbers of the first electrodes 1 covered by orthographic projections of two adjacent second electrodes 2 along the second direction X on the first panel 10 are different.

It can be understood that, when numbers of the first electrodes 1 covered by orthographic projections of two adjacent second electrodes 2 on the first panel 10 are different, the light-emitting effects of the corresponding display areas will also be different so as to disrupt regularity of light output from corresponding areas of the display device and reduce the occurrence of Moire Pattern. It can be arranged such that only numbers of the first electrodes 1 covered by orthographic projections of two adjacent second electrodes 2 along the first direction Y on the first panel 10 are different, or only numbers of the first electrodes 1 covered by orthographic projections of two adjacent second electrodes 2 along the second direction X on the first panel 10 are different, or it can be realized both along the first direction Y and along the second direction X, which is not particularly limited herein. Specifically, a number of the first electrodes 1 covered by an orthographic projection of one of two adjacent second electrodes 2 on the first panel 10 may be 4, and a number of the first electrodes 1 covered by an orthographic projection of the other one of the two adjacent second electrodes 2 on the first panel 10 may be 6 or 8. The specific number is not particularly limited.

Figure 31:
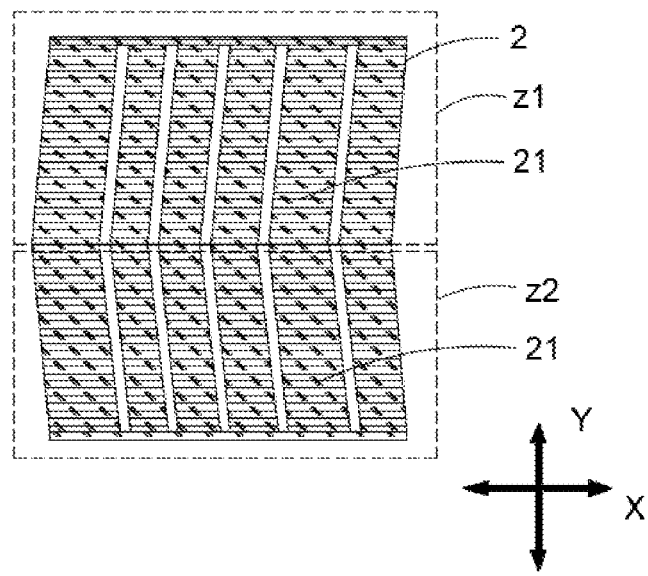
FIG. 31 is a schematic structural diagram of a second electrode according to an embodiment of the present application.

Please refer to FIG. 31, FIG. 31 is a schematic structural diagram of a second electrode 2 according to an embodiment of the present application. In some optional embodiments, the second electrode 2 at least includes a first sub-section z1 and a second sub-section z2 jointed to each other along the first direction Y, and an extension direction of the second extension part 21 in the first sub-section z1 is different from an extension direction of the second extension part 21 in the second sub-section z2.

It should be noted that, the second extension part 21 in the first sub-section z1 and the second extension part 21 in the second sub-section z2 both may include a plurality of second extension segments 211. The second extension segments 211 in the first sub-section z1 have a same extension direction, and the second extension segments 211 in the second sub-section z2 have a same extension direction. That is, the second electrode 2 adopts a two-domain structure such that an arrangement of the liquid crystal molecules corresponding to the second extension part 21 in the first sub-section z1 is different from an arrangement of the liquid crystal molecules corresponding to the second extension part 21 in the second sub-section z2, which increases viewing angle of the display device.

Figure 32:
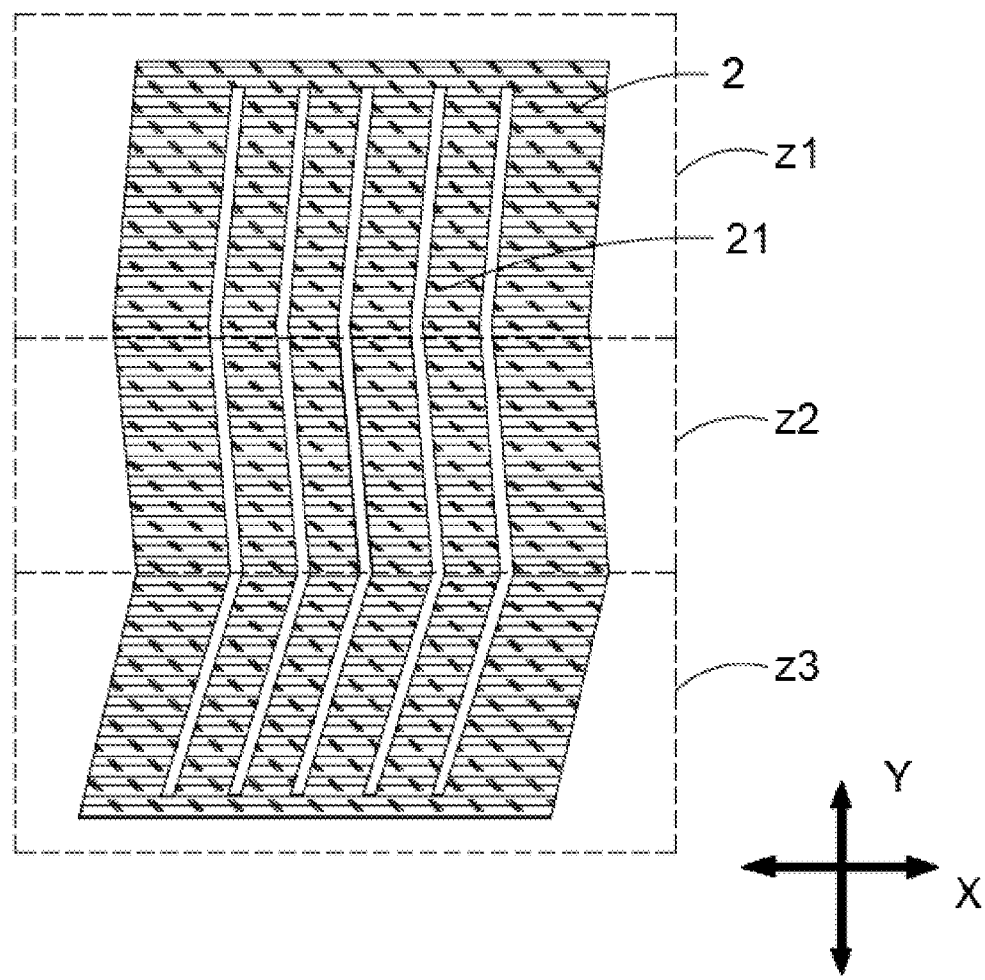
FIG. 32 is a schematic structural diagram of a second electrode according to an embodiment of the present application.

Please refer to FIG. 32, FIG. 32 is a schematic structural diagram of a second electrode 2 according to another embodiment of the present application. In addition to the two-domain structure, the second electrode 2 may also adopt a three-domain or more domain structure. FIG. 32 shows the second electrode 2 adopting the three-domain structure. The second electrode 2 includes a first sub-section z1, a second sub-section z2 and a third sub-section z3 jointed to each other along the first direction Y, an extension direction of the second extension part 21 in the first sub-section z1, an extension direction of the second extension part 21 in the second sub-section z2, and an extension direction of the second extension part 21 in the third sub-section z3 are different from each other to further increase the viewing angle of the display device.

Please refer to FIG. 33, FIG. 33 is a schematic diagram of relative positions of a first electrode 1 and a second electrode 2 according to another embodiment of the present application. In some optional embodiments, orthographic projections of the first sub-section z1 and the second sub-section z2 on the first panel 10 respectively cover at least one first electrode 1.

It can be understood that, the orthographic projections of the first sub-section z1 and the second sub-section z2 on the first panel 10 may respectively cover different first electrodes 1, such that the light-emitting effect of the display area corresponding to the first electrode 1 covered by orthographic projection of the first sub-section z1 is different from the light-emitting effect of the display area corresponding to the first electrode 1 covered by orthographic projection of the second sub-section z2, so as to disrupt light-emitting regularity. Optionally, a number of first electrodes 1 covered by the orthographic projection of the first sub-section z1 on the first panel 10 may be different from a number of first electrodes 1 covered by the orthographic projection of the second sub-section z2 on the first panel 10 so as to further increase light-emitting difference between display areas corresponding to the first sub-section z1 and the second sub-section z2, and reduce the occurrence of Moire Pattern.

As shown in FIG. 33, in some optional embodiments, an orthographic projection of a joint part of the first sub-section z1 and the second sub-section z2 on the first panel 10 does not overlap with the first electrode 1.

It should be noted that, the joint part of the first sub-section z1 and the second sub-section z2 is a position in which the extension direction of the second extension part 21 changes. Since arrangement directions of the liquid crystal molecules at the joint part of the first sub-section z1 and the second sub-section z2 is relatively chaotic, in order to ensure the light control effect of the second panel 20 and prevent the corresponding position of the first panel 10 from being affected, the orthographic projection of the joint part of the first sub-section z1 and the second sub-section z2 on the first panel 10 does not overlap with the first electrode 1. Specifically, the first electrodes 1 may be arranged on two sides of the orthographic projection of the joint part of the first sub-section z1 and the second sub-section z2 on the first panel 10, such that the light-emitting effect of the first electrodes 1 is not affected by the joint part of the first sub-section z1 and the second sub-section z2.

In some optional embodiments, an orthographic projection of one single second electrode 2 on the first panel 10 covers one single first electrode 1, and an arrangement form of the second extension part 21 of the second electrode 2 is different from an arrangement form of the first extension part 11 of the corresponding covered first electrode 1.

It can be understood that, in this embodiment, the second electrodes 2 may be arranged in a one-to-one correspondence with the first electrodes 1, and an arrangement form of the second extension parts 21 of the second electrodes 2 is different from an arrangement form of the first extension parts 11 of the corresponding covered first electrodes 1, so as to change the light-emitting effect of the display area of the first electrodes 1 and the second electrodes 2.

Please refer to FIG. 34, FIG. 34 is a flowchart of a method for controlling a display device according to an embodiment of the present application. An embodiment of the present application also provides a method for controlling a display device, including:

S110: providing a same first driving voltage to a first electrode 1 of each first sub-pixel p1 respectively; and/or providing a same second driving voltage to a second electrode 2 of each second sub-pixel p2 respectively, S120: under the same first driving voltage, deflection angles of liquid crystal molecules driven by two adjacent first electrodes 1 having first extension parts 11 with different arrangement forms are different; and/or under the same second driving voltage, deflection angles of liquid crystal molecules driven by two adjacent second electrodes 2 having second extension parts 21 with different arrangement forms are different.

In the method for controlling the display device according to the embodiment of the present application, when a same first driving voltage is provided to a first electrode 1 of each first sub-pixel p1 respectively, since the first extension parts 11 of two adjacent first electrodes 1 are arranged in different forms, deflection angles of the liquid crystal molecules driven by the two adjacent first electrodes 1 are different. In this case, the refractive index of the corresponding liquid crystal molecules also changes accordingly, so as to change phase difference of light output from two adjacent first electrodes 1, disrupt interference conditions, and reduce the occurrence of Moire Pattern. Similarly, when a same second driving voltage is provided to a second electrode 2 of each second sub-pixel p2 respectively, since the second extension parts 21 of two adjacent second electrodes 2 are arranged in different forms, deflection angles of the liquid crystal molecules driven by the two adjacent second electrodes 2 are different, so as to change phase difference of light output from two adjacent second electrodes 2, disrupt interference conditions, and reduce the occurrence of Moire Pattern.

According to actual requirements, the first driving voltage and the second driving voltage may adopt a rectangular pulse voltage or a constant voltage, which is not particularly limited herein.

Figure 35:
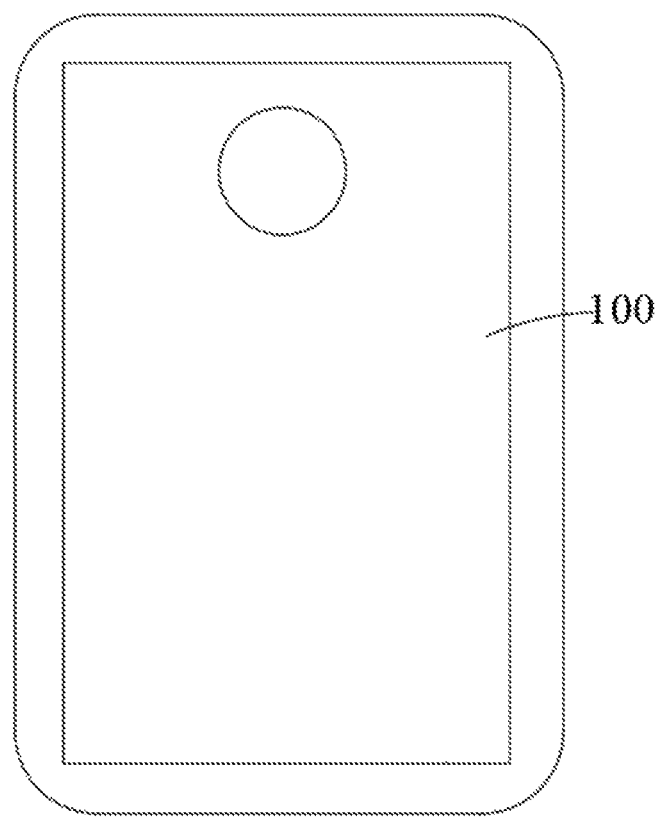
FIG. 35 is a schematic structural diagram of an electronic device according to an embodiment of the present application.

Please refer to FIG. 35, FIG. 35 is a schematic structural diagram of an electronic device according to an embodiment of the present application. An embodiment of the present application further provides an electronic device, including the display device 100 according to any one of the aforesaid embodiments.

The electronic device according to the embodiment of the present application has the technical effect of the technical solution of the display device 100 in any one of the aforesaid embodiments, and the explanations of structures and terms that are the same or corresponding to the above embodiments are not repeated here.

The electronic device according to the embodiment of the present application can be applied to a mobile phone, and can also be any electronic product with a display function, including but not limited to the following categories: televisions, notebook computers, desktop displays, tablet computers, digital cameras, smart bracelets, smart glasses, vehicle-mounted displays, medical equipment, industrial control equipment, touch interactive terminals, etc., which are not particularly limited in this embodiment of the present application.

The above are only specific implementations of the present application, those skilled in the art can clearly understand that, for the convenience and brevity of the description, the specific working processes of the above-described systems, modules and units can be referred to the corresponding processes in the foregoing method embodiments, which is not repeated here. It should be understood that, the protection scope of this application is not limited to this, and any person skilled in the art can easily think of various equivalent modifications or replacements within the technical scope disclosed in this application, and these modifications or replacements should all be covered within the scope of protection of this application.

It should also be noted that, according to the exemplary embodiments described in the present application, some methods or systems are described based on a series of steps or apparatus. However, the present application is not limited to the above order of the steps. That is, the steps may be executed in the order described in the embodiments or in orders different from that in the embodiments, or several steps may be executed simultaneously.

What is claimed is:

1. A display device, comprising a first panel and a second panel sequentially stacked along a direction opposite to a light-emitting direction, wherein:
   the first panel comprises first sub-pixels, the second panel comprises second sub-pixels, the first sub-pixels and the second sub-pixels are respectively arranged in an array along a first direction and a second direction, and the first direction and the second direction intersect with each other;
   each first sub-pixel is provided with a first electrode, the first electrode has a first extension part, and each second sub-pixel is provided with a second electrode, the second electrode has a second extension part; and
   in the first panel, first extension parts of first electrodes of at least two adjacent first sub-pixels are arranged in different forms; and/or, in the second panel, second extension parts of second electrodes of at least two adjacent second sub-pixels are arranged in different forms,
   wherein the first extension part comprises first extension segments, one single first electrode comprises at least two first extension segments, each first extension segment extends along the first direction on the first electrode and is arranged along the second direction, and the first extension segments in a same first electrode are arranged in different forms; and
   wherein the second extension part comprises second extension segments, one single second electrode comprises at least two second extension segments, each second extension segment extends along the first direction on the second electrode and is arranged along the second direction, and the second extension segments in a same second electrode are arranged in different forms.

2. The display device according to claim 1, wherein a length of the first sub-pixel along the first direction is greater than a length of the first sub-pixel along the second direction, and first extension parts of first electrodes of adjacent first sub-pixels along the second direction are arranged in different forms; and/or
   wherein a length of the second sub-pixel along the first direction is greater than a length of the second sub-pixel along the second direction, and second extension parts of second electrodes of adjacent second sub-pixels along the second direction are arranged in different forms.

3. The display device according to claim 2, wherein a length of the first extension part along the first direction is greater than a length of the first extension part along the second direction; and/or
   wherein a length of the second extension part along the first direction is greater than a length of the second extension part along the second direction.

4. The display device according to claim 2, wherein the first sub-pixels have a same color in the first direction; and/or the second sub-pixels have a same color in the first direction.

5. The display device according to claim 1, wherein in one single first electrode, an area ratio of the first extension part is greater than or equal to one third; and/or, in one single second electrode, an area ratio of the second extension part is greater than or equal to one third.

6. The display device according to claim 5, wherein the first extension segments of at least two adjacent first electrodes are different from each other in at least one of extension track, shape, length along the first direction, width along the second direction, and arrangement position; and/or
   wherein the second extension segments of at least two adjacent second electrodes are different from each other in at least one of extension track, shape, length along the first direction, width along the second direction, and arrangement position.

7. The display device according to claim 1, wherein numbers of the first extension segments of the first electrodes in at least two adjacent first sub-pixels are different; and/or
   wherein numbers of the second extension segments of the second electrodes in at least two adjacent second sub-pixels are different.

8. The display device according to claim 7, wherein numbers of the first extension segments of at least two adjacent first electrodes are in a coprime relationship; and/or
   numbers of the second extension segments of at least two adjacent second electrodes are in a coprime relationship.

9. The display device according to claim 1, wherein the first extension segments of at least two adjacent first electrodes are fold lines, and a difference between maximum fold angles of the first extension segments of two adjacent first electrodes is in a range from 5° to 15°; and/or
   wherein the second extension segments of at least two adjacent second electrodes are fold lines, and a difference between maximum fold angles of the second extension segments of two adjacent second electrodes is in a range from 5° to 15°.

10. The display device according to claim 1, wherein the first extension segment in a fold line shape comprises at least three first sub-extension segments with different extension directions, and numbers of first sub-extension segments of the first extension segments of two adjacent first electrodes are different; or
    wherein extension directions of first sub-extension segments of the first extension segments of two adjacent first electrodes are different.

11. The display device according to claim 1, wherein the first extension segments of one of at least two adjacent first electrodes are fold lines, and the first extension segments of the other are bending lines; and/or wherein the second extension segments of one of at least two adjacent second electrodes are fold lines, and the second extension segments of the other are bending lines, wherein the first extension segments of at least two adjacent first electrodes are bending lines, and bending directions of the first extension segments of two adjacent first electrodes are different; and/or wherein the second extension segments of at least two adjacent second electrodes are bending lines, and bending directions of the second extension segments of two adjacent second electrodes are different.

12. The display device according to claim 1, wherein the first extension segments have wave shapes, each first extension segment comprises at least two bending segments with different waveforms extending along the first direction, and in adjacent first electrodes along the second direction, bending segments with a same waveform are partly staggered from each other in the first direction.

13. The display device according to claim 12, wherein in adjacent first electrodes along the second direction, the bending segments with a same waveform are staggered from each other by a same distance in the first direction.

14. The display device according to claim 1, wherein within one single first electrode, the first extension segments are asymmetrically arranged with respect to a center of the first electrode, and the first extension segments of two adjacent first electrodes are symmetrically arranged with respect to a center of the two adjacent first electrodes; and/or wherein within one single second electrode, the second extension segments are asymmetrically arranged with respect to a center of the second electrode, and the second extension segments of two adjacent second electrodes are symmetrically arranged with respect to a center of the two adjacent second electrodes.

15. The display device according to claim 1, further comprising a first extension part group and a second extension part group, wherein the first extension part group and the second extension part group both comprise at least two adjacent first sub-pixels; and wherein an arrangement form of the first extension parts of the first electrodes of the first sub-pixels in the first extension part group is different from an arrangement form of the first extension parts of the first electrodes of the first sub-pixels in the second extension part group, and the first extension part group and the second extension part group are alternately arranged along the first direction and the second direction respectively.

16. The display device according to claim 1, wherein the first panel comprises first sub-pixels of M colors, adjacent N first sub-pixels along the second direction form a pixel set, and the first extension parts of the first electrodes of the first sub-pixels in the pixel set are arranged in different forms; and wherein N is a positive integer that is not an integer multiple of M, and N≥4, M≥3.

17. The display device according to claim 16, wherein the first panel comprises first sub-pixels of 3 colors, adjacent 4 first sub-pixels along the second direction form the pixel set; or wherein the first panel comprises first sub-pixels of 4 colors, adjacent 5 first sub-pixels along the second direction form the pixel set.

18. The display device according to claim 16, wherein two same pixel sets are arranged partly overlapped and partly staggered along the first direction; or wherein two same pixel sets are arranged partly overlapped and partly staggered along the second direction.

19. The display device according to claim 16, wherein L adjacent pixel sets along the first direction are arranged partly overlapped and partly staggered along the second direction, and wherein L≤N, and L is a positive integer≥2.

20. The display device according to claim 16, wherein the first extension parts in two adjacent pixel sets are arranged in different forms.

21. The display device according to claim 1, wherein the first sub-pixel is further provided with a third electrode opposite to the first electrode and a first liquid crystal layer, and the first electrode and the third electrode form an electric field to drive liquid crystal molecules in the first liquid crystal layer to deflect; and/or wherein the second sub-pixel is further provided with a fourth electrode opposite to the second electrode and a second liquid crystal layer, and the second electrode and the fourth electrode form an electric field to drive liquid crystal molecules in the second liquid crystal layer to deflect.

22. The display device according to claim 1, wherein a maximum size of the first electrode along the first direction is smaller than a maximum size of the second electrode along the first direction, and a maximum size of the first electrode along the second direction is smaller than a maximum size of the second electrode along the second direction.

23. The display device according to claim 1, wherein an orthographic projection of one single second electrode on the first panel covers at least two first electrodes.

24. The display device according to claim 1, wherein numbers of the first electrodes covered by orthographic projections of two adjacent second electrodes along the first direction on the first panel are different; and/or wherein numbers of the first electrodes covered by orthographic projections of two adjacent second electrodes along the second direction on the first panel are different.

25. The display device according to claim 1, wherein the second electrode at least comprises a first sub-section and a second sub-section jointed to each other along the first direction, and an extension direction of the second extension part in the first sub-section is different from an extension direction of the second extension part in the second sub-section.

26. The display device according to claim 25, wherein orthographic projections of the first sub-section and the second sub-section on the first panel respectively cover at least one first electrode.

27. The display device according to claim 25, wherein an orthographic projection of a joint part of the first sub-section and the second sub-section on the first panel does not overlap with the first electrode.

28. The display device according to claim 1, wherein an orthographic projection of one single second electrode on the first panel covers one single first electrode, and an arrangement form of the second extension part of the second electrode is different from an arrangement form of the first extension part of the corresponding covered first electrode.

29. An electronic device, comprising the display device according to claim 1.

* * * * *